United States Patent [19]

Suzuki

[11] Patent Number: 5,134,667
[45] Date of Patent: Jul. 28, 1992

[54] AREA DISCRIMINATING SYSTEM FOR AN IMAGE PROCESSING SYSTEM

[75] Inventor: Yuzuru Suzuki, Kanagawa, Japan
[73] Assignee: Fuji Xerox Co., Ltd., Tokyo, Japan
[21] Appl. No.: 565,022
[22] Filed: Aug. 9, 1990
[30] Foreign Application Priority Data
   Aug. 11, 1989 [JP] Japan .................................. 1-209279
[51] Int. Cl.$^5$ .............................................. G06K 9/48
[52] U.S. Cl. .................................... 382/22; 382/17; 382/54; 358/80
[58] Field of Search .................. 382/17, 22, 50–54; 358/75, 80, 445, 450, 451, 453, 464–466

[56] References Cited

U.S. PATENT DOCUMENTS

| | | | |
|---|---|---|---|
| 4,554,593 | 11/1985 | Fox et al. | 382/54 |
| 4,577,235 | 3/1986 | Kannapell et al. | 358/462 |
| 4,636,863 | 1/1987 | Kaikazi et al. | 382/22 |
| 4,700,399 | 10/1987 | Yoshida | 382/17 |
| 4,707,745 | 11/1987 | Sakano | 382/50 |
| 4,982,277 | 1/1991 | Katoh et al. | 358/80 |

*Primary Examiner*—David K. Moore
*Assistant Examiner*—Jose L. Couso
*Attorney, Agent, or Firm*—Finnegan, Henderson, Farabow, Garrett & Dunner

[57] ABSTRACT

An area discriminating system for use in an image processing system capable of processing an image signal including character images signals and halftone images signals which determines the hues of the images represented by the image signal, produces hue present signals for each color of a selected number of colors which is a component of the hues of the images and a hue absent signals for each color of the selected number of colors which is not a component of the hues of the images, detects edge portions of images represented by the image signal, produces edge signals having values representing the edge portions, and produces edge emphasized signals for each hue included in the portion of the image represented by the edge signals. The image processing system further determines whether the image represented by the image signal is a halftone image or a character image and produces the edge emphasized signals further in accordance with the image determination.

15 Claims, 30 Drawing Sheets

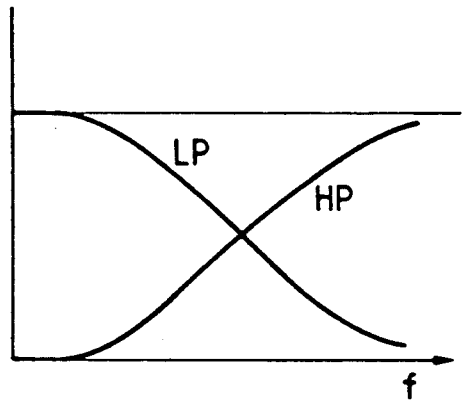
FIG. 10(a)
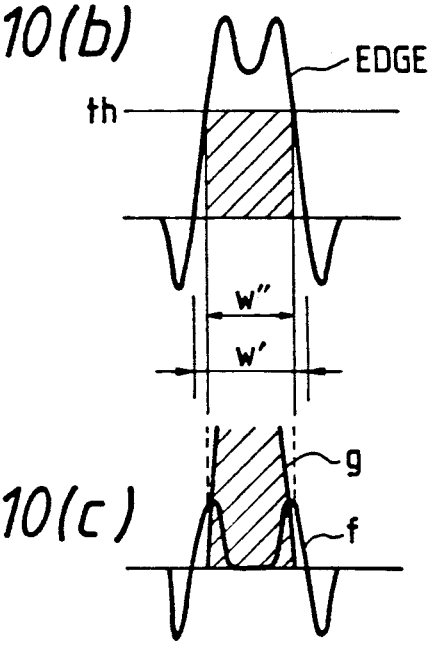
FIG. 10(b)
FIG. 10(c)
FIG. 18
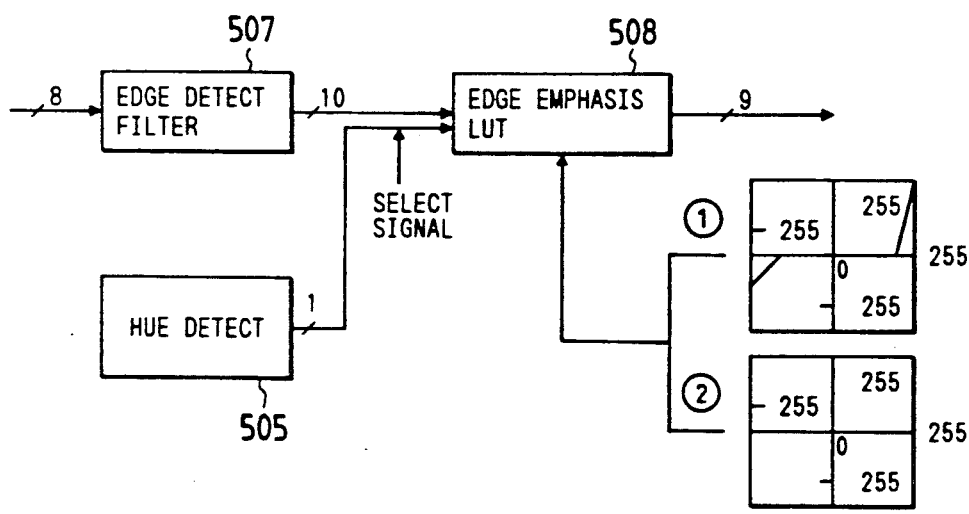

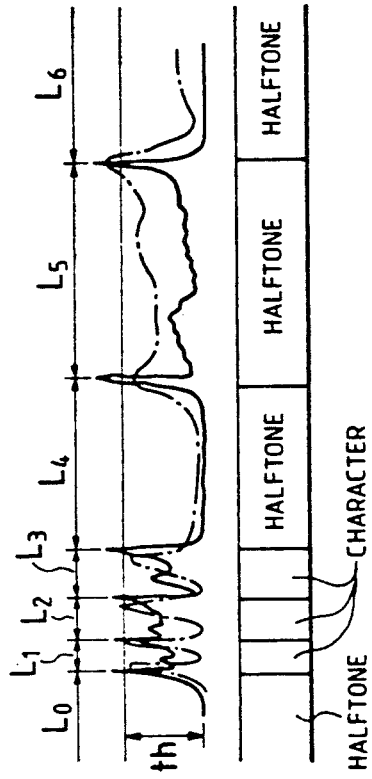
FIG. 15(a)
FIG. 15(b)
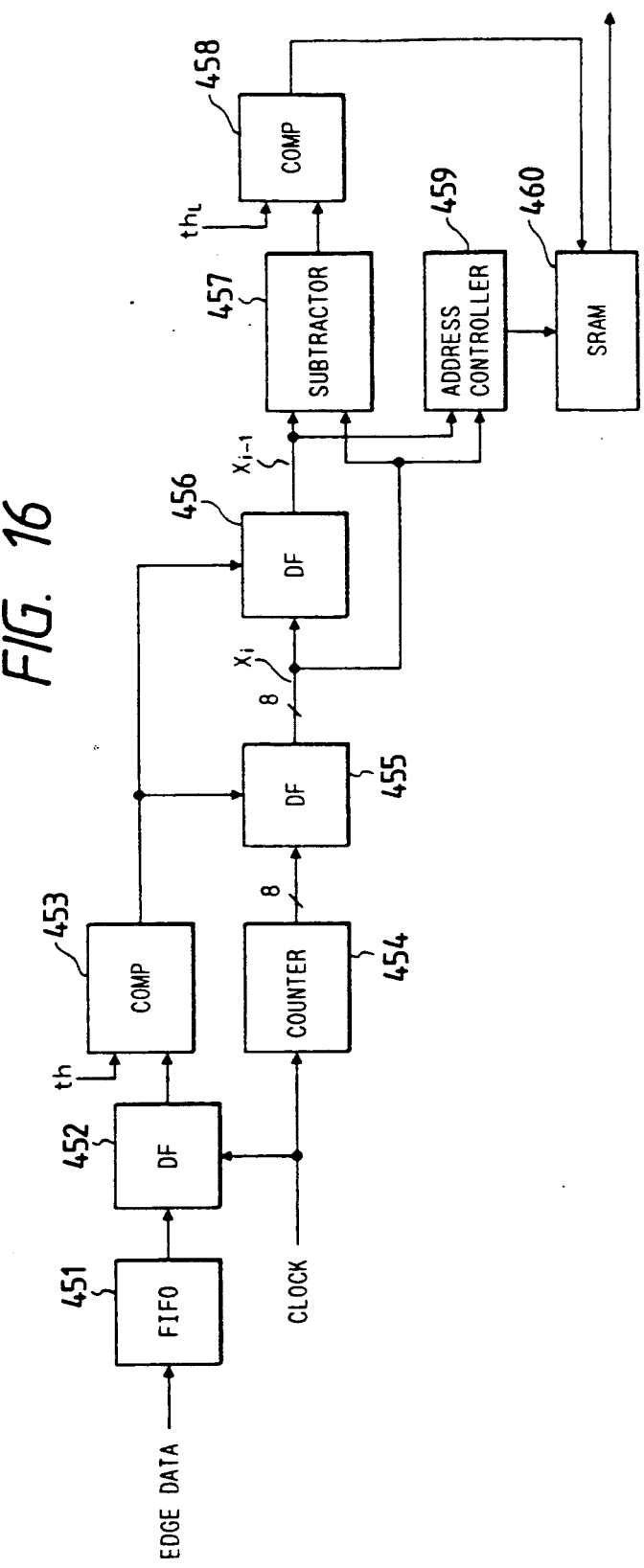
FIG. 16

| DETERMINED HUE | DETERMINATION FLAG | r | m | c' | m' | y' |
|---|---|---|---|---|---|---|
| W | | 0 | 0 | 0 | 0 | 0 |
| Y | | * | 0 | 0 | 0 | 1 |
| M | | * | 0 | 0 | 1 | 0 |
| C | | * | 0 | 1 | 0 | 0 |
| B | | * | 0 | 1 | 1 | 0 |
| G | | * | 0 | 1 | 0 | 1 |
| R | | * | 0 | 0 | 1 | 1 |
| K | | 0 | 1 | * | * | * |

| DEVELOPING COLOR \ OUTPUT HUE | W | Y | M | C | B | G | R | K |
|---|---|---|---|---|---|---|---|---|
| y | 0 | 1 | 0 | 0 | 0 | 1 | 1 | 0 |
| m | 0 | 0 | 1 | 0 | 1 | 0 | 1 | 0 |
| c | 0 | 0 | 0 | 1 | 1 | 1 | 0 | 0 |
| k | 0 | 0 | 0 | 0 | 0 | 0 | 0 | 1 |

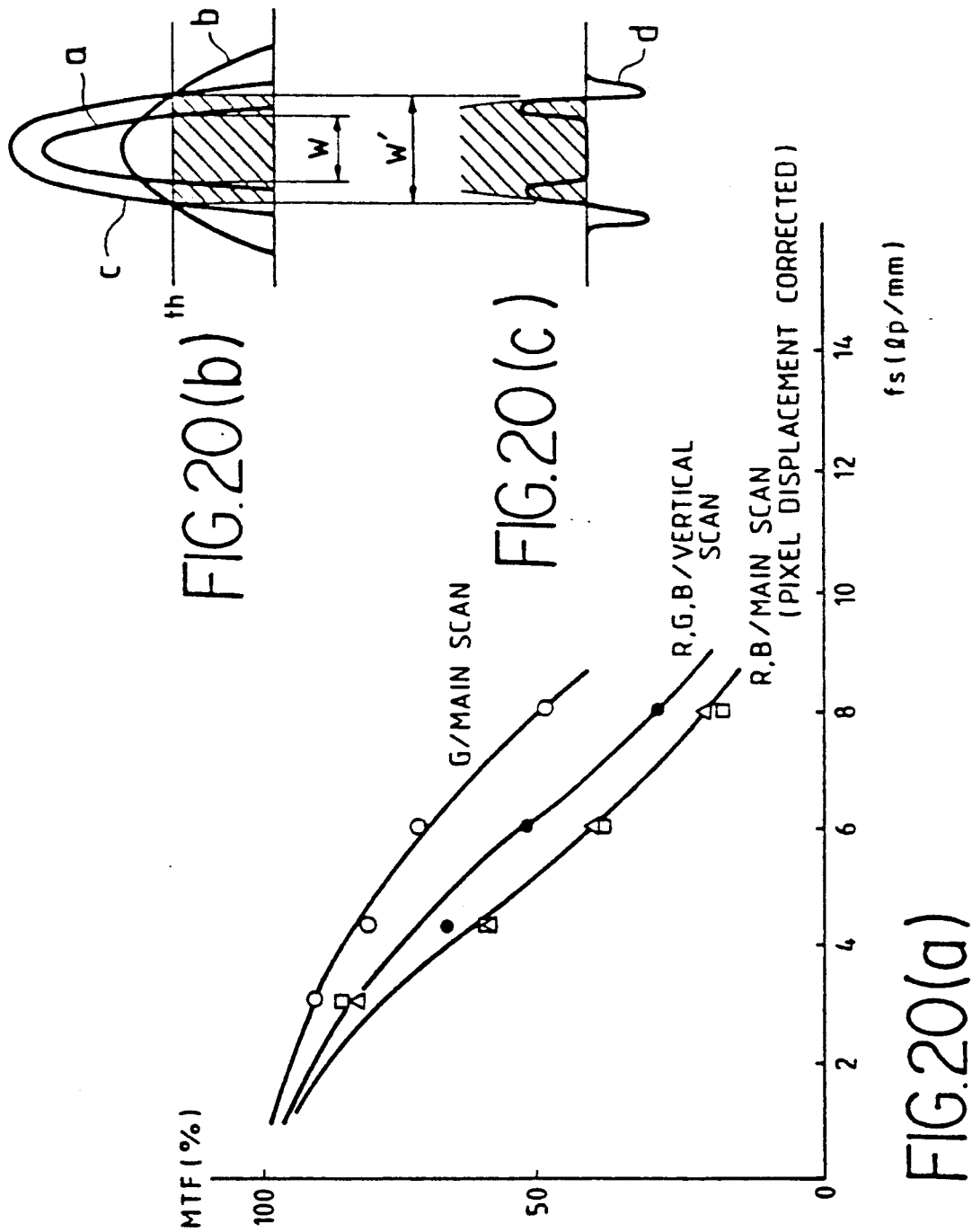

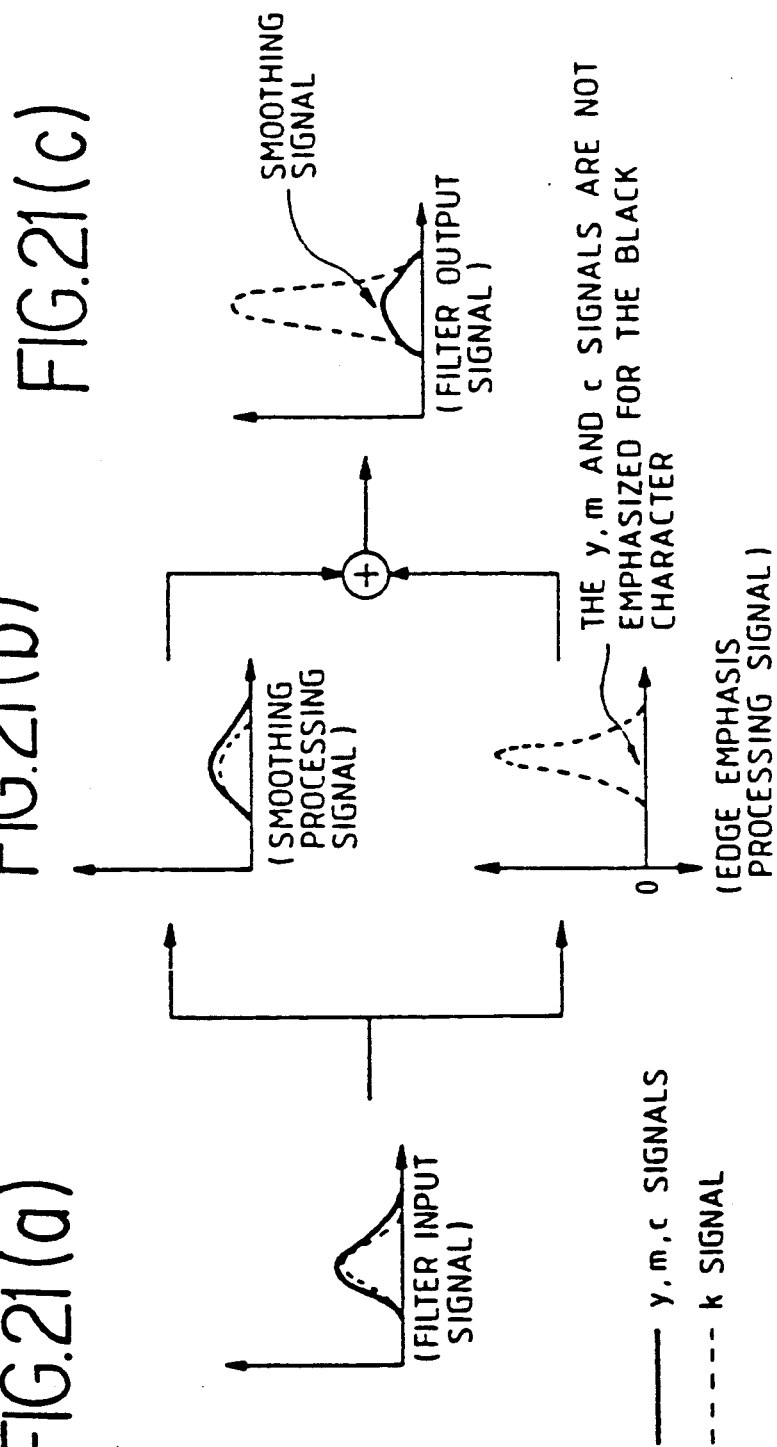

AREA DISCRIMINATING SYSTEM FOR AN IMAGE PROCESSING SYSTEM

FIELD OF THE INVENTION

The present invention relates to an image area discriminating system, which discriminates a character area from a halftone area on an original containing a character image and a halftone image and improves the reproductivity of each area through the area discrimination.

BACKGROUND OF THE INVENTION

FIG. 17 is a block diagram showing an arrangement of a digital color image processing system. FIG. 18 is a block diagram showing an arrangement of a conventional edge processing circuit. FIGS. 19(a)-(c) are block diagrams showing an arrangement of a hue detect circuit and related tables. FIGS. 20(a) through (c) are a graph and explanatory diagrams, which are useful in explaining a character spread phenomenon. FIGS. 21(a) through (c) are explanatory diagrams for explaining edge emphasis processing.

Generally, a color copying machine exercises a developing process of Y (yellow), M (magenta), C (cyan), and K (black), to reproduce a full color image of a color original. To store full color image data gathered by a single scan of a color image of an original, a considerably large memory capacity is required. To avoid this, in the conventional developing process, the machine scans the color original separately for each color, and executes signal processing.

In image reading, a line sensor optically reads an image to gather image data in terms of color separated signals of B (blue), G (green), and R (red). The separated color signals, as shown in FIG. 17, pass through an END converter 501 and a color masking (color correction) 502, and are transformed into color toner signals Y, M and C. Then, the toner signals enter a UCR 503. In the UCR, the black (K) generation and the under color removal are carried out. The toner signal as generally designated by X passes through a hue separation type non-linear filter section, TRC (tone adjustment) 510, and SG (screen generator) 511, and is converted into binary data. The binary signal is used to control a laser beam that expose a photosensitive member. The images of the respective colors are superposed by the mesh-dot gradation, to reproduce the full color image.

In the images handled by a digital color image processing system, a binary image, such as characters and lines, and a halftone image, such as photographs and mesh-dot printing materials, usually coexist. To obtain a binary image of high sharpness, the original image containing such different images is subjected to edge emphasis processing, which is based on non-linear filter processing. As regards the edge emphasis processing, there have been many proposals. One of those proposals is the arrangement of FIG. 17, which is provided with a hue separation type non-linear filter section.

The filter section, as shown, receives the image data signal X of a developing color as selected from Y, M, C, and signals according to the developing process. The toner signals are generated through black generation and under color removal processing. The image data signal X is branched into two routes. The data signal X flowing through one of the routes enters a smoothing filter 504 where it is smoothed. The data signal X is also edge emphasized by the combination of a "r (gamma)" conversion 506, an edge detect filter 507, and an edge emphasizing LUT 508. The data signals from the two routes are added together by an adder 509, which in turn produces a non-linear filter signal. An arrangement of the edge emphasis processing circuit is shown in FIG. 18.

In edge processing, the hue detect circuit 505 detects the hue of an input image, and determines whether the developing color at that time is a necessary color or an unnecessary color. If the input image is a black area, the chromatic signals of Y, M, and C are not edge emphasized, but only the color signal of K is emphasized according to an edge quantity.

As shown in FIG. 19(a), the hue detect circuit 505 is made up of a max./min. circuit 512 for obtaining the maximum and minimum values of the toner signals Y, M, and C, a multiplexer 513 for selecting a developing color, a subtractor 514 for calculating a difference between the maximum and minimum values, another subtractor 515 for calculating a difference between the minimum value and a developing color, and comparators 516 to 518, which compare input signals with threshold values. When the input signals are larger than the threshold values, the comparators produce signals r, m, c', m', an y' with logic value "1".

The hue detect circuit recognizes a hue by using a hue decision table as shown in FIG. 19(b). Further, it determines whether the developing color is a necessary color of logic "1" or an unnecessary color of logic "0" by using a necessary/unnecessary color decision table shown in FIG. 19(c). The hues that are output as the result of the hue determination, are eight colors, (white), Y, M, C, B, G, R, and K, that are used as normal character colors.

As seen from the hue decision table, if the hue is B, the necessary developing colors "m" and "c", and the remaining developing colors are unnecessary. In this case, during a necessary color cycle, the edges of the signal are emphasized by the LUT (1) of the edge emphasis LUT 508. During an unnecessary color cycle, the edges are not emphasized by the LUT (2) of the LUT 508.

As described above, in edge emphasis processing, the hue of the input signal is discriminated by comparing the input signal with the threshold value "th." Depending on the comparison result, an edge detect signal is converted, by the edge emphasis LUT, into an edge emphasis signal. Meanwhile, the MTF (modulation transfer function) characteristic of the IIT (image input terminal) becomes poor as frequency becomes high, as shown in FIG. 20(a). The degree of degradation of the MTF also changes depending on the color and the main and vertical scan directions. When the MTF is degraded, an optical density distribution curve on "a" an original is flattened to be a curve "b" (see FIG. 20(b)). In detecting a hue, the signal "b" is compared with the threshold value "th," and the hue is determined on the basis of the comparison result. Accordingly, the signal whose hue is recognized has a width w', which is much wider than the width "w" of the original signal. This defines a range of the edge emphasis processing. On the basis of the determination result, an edge emphasis signal "d" as shown in FIG. 20(c) is added to it, to emphasize the edges. Consequently, it is reproduced in the form of a widened character as indicated by "c" in FIG. 20(b). The character widening is caused not only by the IIT, but also by developing material, developing method, developing characteristic and the like.

When compared to the conventional edge emphasis system in which the color signals of Y, M, C, and K are all subjected to the edge emphasis processing, the edge emphasis system as mentioned above improves the reproduction quality of a black character, but the smoothing signals are left in the Y, M, and C signals. As indicated by the edge emphasis LUT 508 shown in FIG. 18, the necessary color is emphasized by the LUT (1), while the unnecessary color is removed by the LUT (2). Accordingly, an edge emphasis processing signal is generated that does not emphasize the colors of Y, M, and C of a filter input signal of a black character (as shown in FIG. 21(a)) does emphasize only the black signal K. In the smoothing filter, a smoothing processing signal resulting from smoothing all of the color signals Y, M, C, and K is generated, as shown in FIG. 21(b). When finally composed the smoothing signal of Y, M, C, and K is as shown in FIG. 21(c).

Usually, even in the case of the black character, the signal contains not only the K signal but also the Y, M, and C signals. The smoothed colors of Y, M, and C appear at the edge portions. Thus, the black character cannot be reproduced by a single color of K. In connection with the case of the single color reproduction, the instant case suffers from color change and a loss of color purity, which are due to widening of lines, impaired registration, and the like. The resultant image will not be sharp.

In case where there are originals containing binary images, such as characters and lines, and halftone images, such as photographs and mesh-dot printing materials, and the type of the image can be designated for each original or each area, it is possible to select optimum parameters for the respective types of images. In the case of an image of the type in which the binary image and the halftone image coexist (this type of the image will be referred to as an integrated image original), the parameters selected are those allowing both types of images to be reproduced. Accordingly, the binary image and the halftone image cannot be individually processed in the best conditions, and hence satisfactory images are hard to obtain. In the case of the binary image, the edge emphasis is weak, and the sharpness of the characters is lost. In the case of a black character, the edge portions and small characters are blurred. In the case of the halftone image, the frequencies near the edge detect frequency ar emphasized. This impairs the smoothness of the halftone image, and causes unpleasant Moire to appear in the image. Additionally the edges are unnaturally emphasized. Thus, the resultant image looks hard and rough.

SUMMARY OF THE INVENTION

Accordingly, an object of the present invention is to improve the precision for discriminating areas in an integrated image original.

Another object of the present invention is to enable the area discrimination to be corrected for every block of the image.

A further object of the present invention is to enable both a character image and a halftone image to be reproduced with high image quality.

An additional object of the present invention is to make it easy to discriminate image areas within a block of the image. These and other objects are obtained by an area discriminating system for use in an image processing system capable of processing an image signal including character images signals and halftone images signals comprising hue determining means for determining the hues of the images represented by the image signal and for producing hue present signals for each color of a selected number of colors which is a component of the hues of the images and a hue absent signals for each color of the selected number of colors which is not a component of the hues of the images, edge detecting means for detecting edge portions of images represented by the image signal and for producing edge signals having values representing the edge portions, and edge emphasis means receiving the hue present signals, the hue absent signals, and the edge signals and for producing edge emphasized signals for each hue included in the portion of the image represented by said edge signals. An image determining means determines whether the image represented by the image signal is a halftone image or a character image such that its edge emphasis means produces the edge emphasized signals further in accordance with the image determination.

BRIEF DESCRIPTION OF THE INVENTION

The manner by which the above objects, features, and advantages are attained will be fully apparent from the following detailed description when it is considered in view of the drawings, wherein.

Figure 3A:
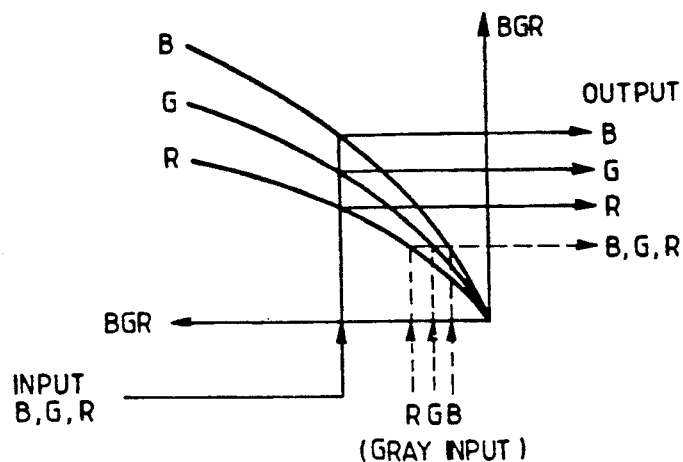
Figure 3B:
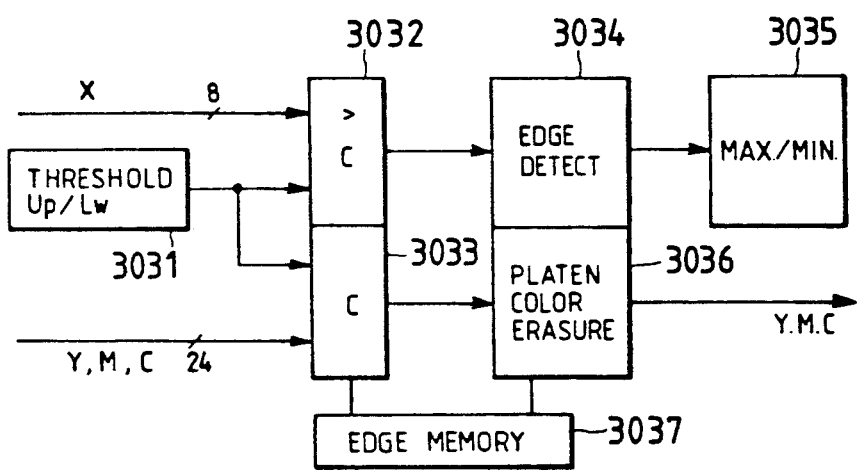
Figure 3C:
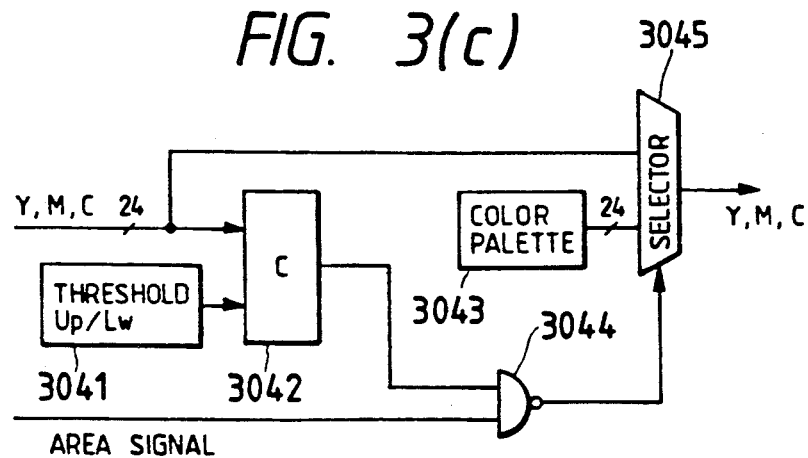
Figure 3D:
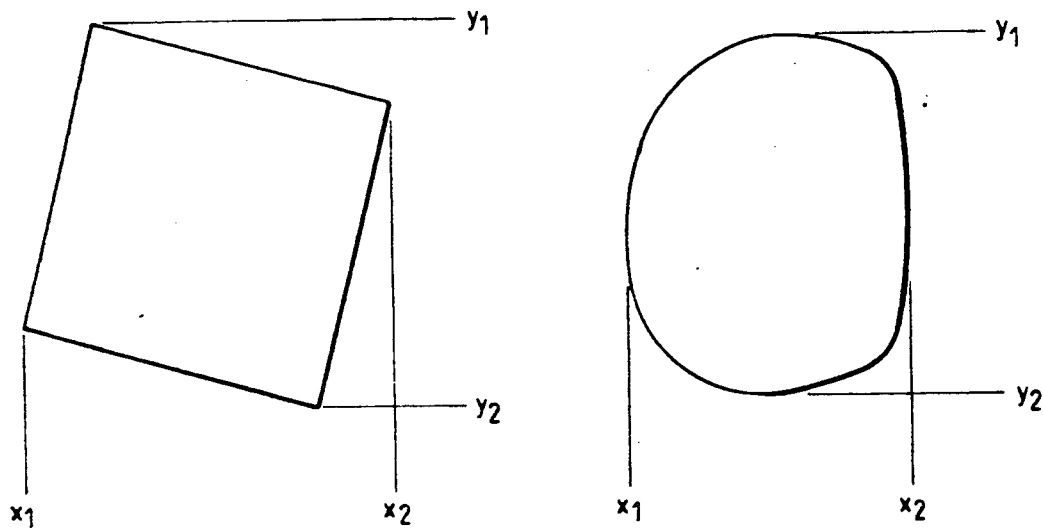
Figure 3E:
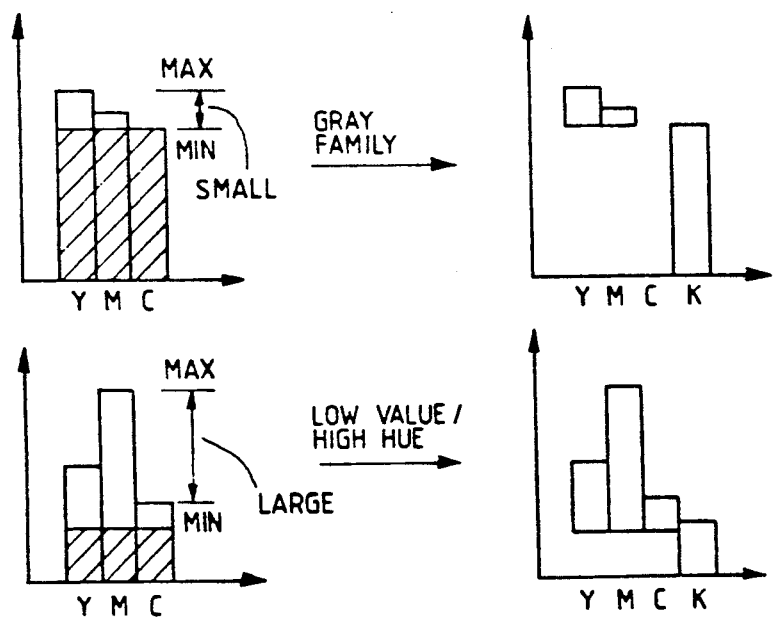
Figure 3H:
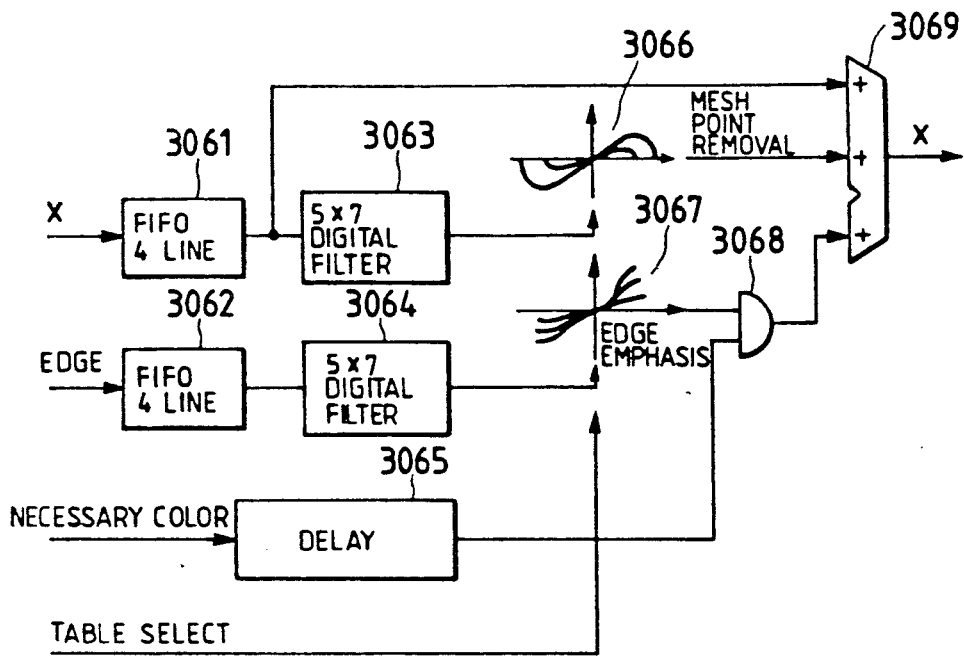
Figure 3J:
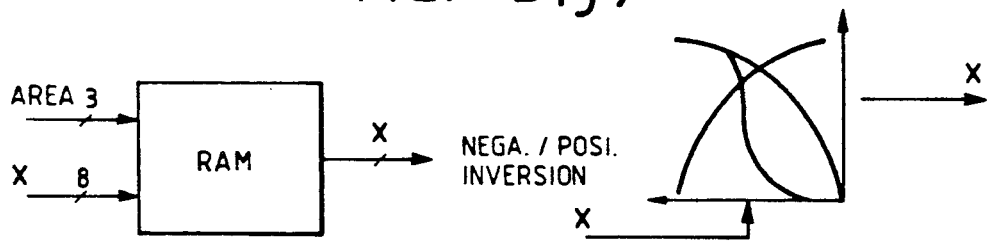
Figure 3K:
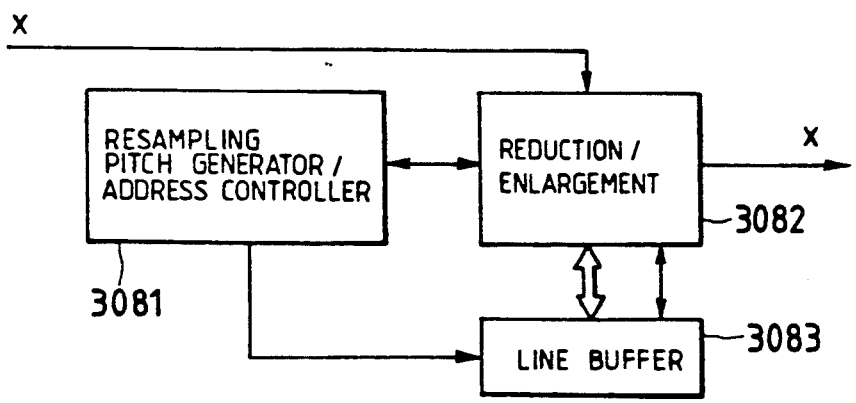
Figure 3I:
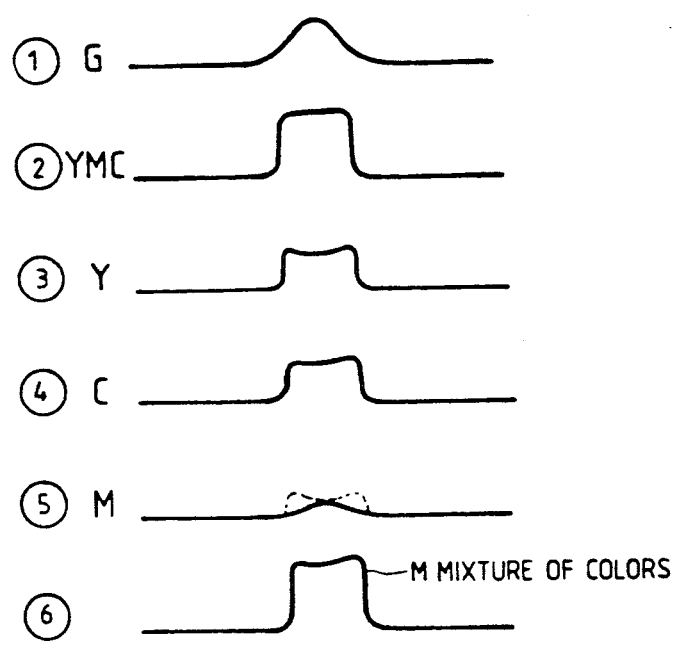
Figure 3L:
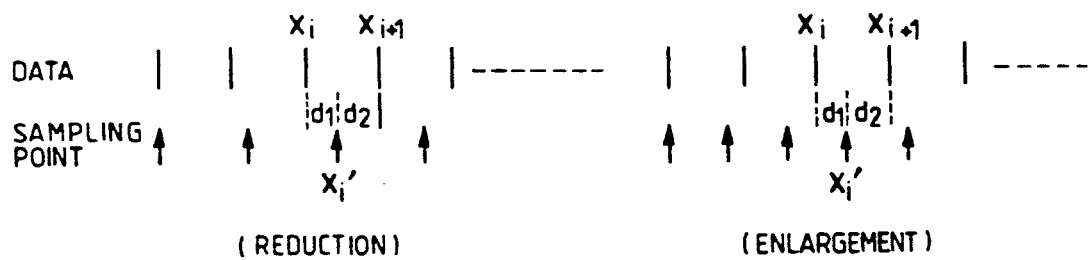
Figure 3M:
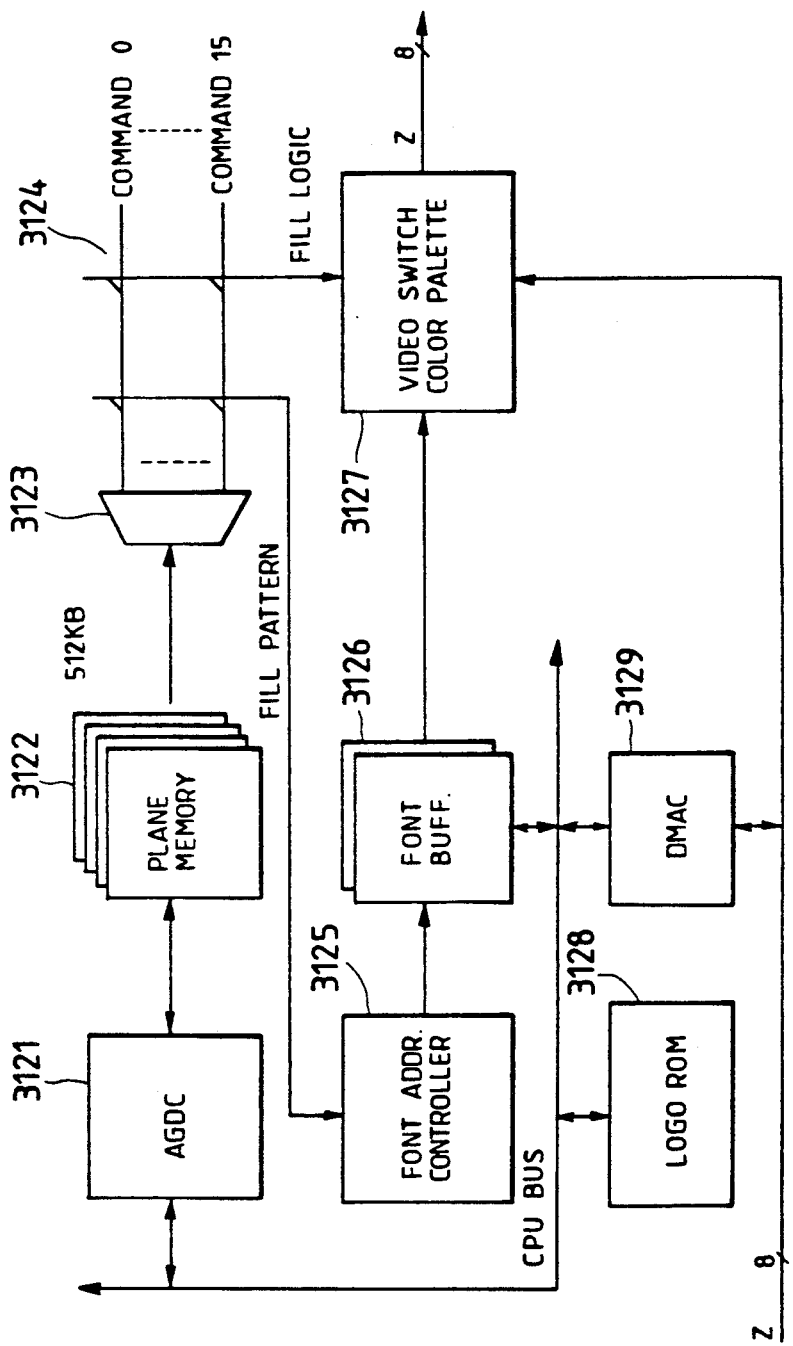
Figure 3N:
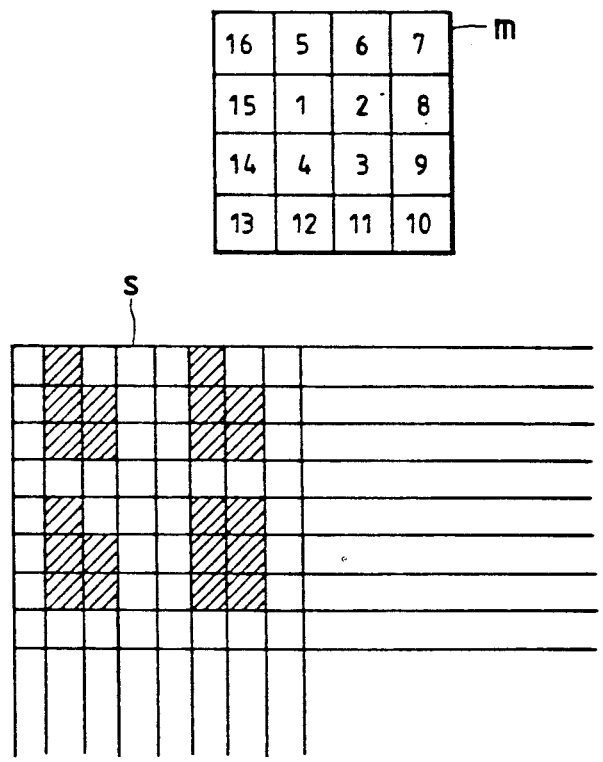
Figure 3O:
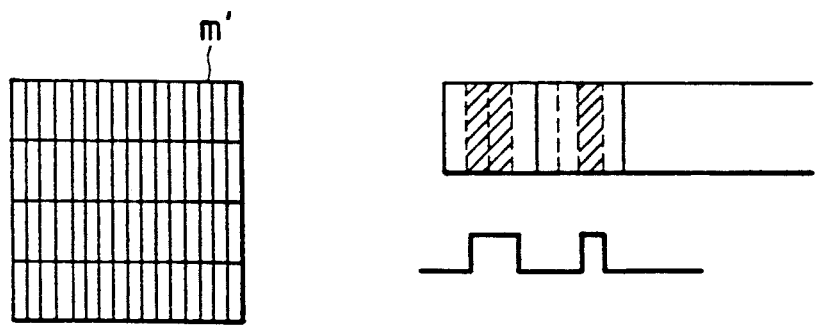
Figure 3P:
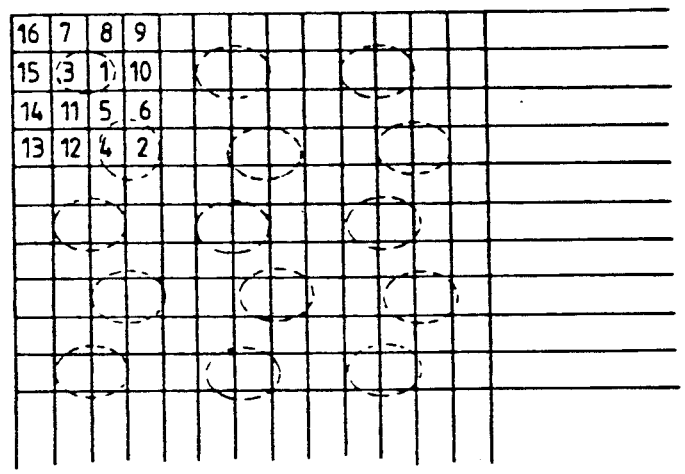
Figure 3Q:
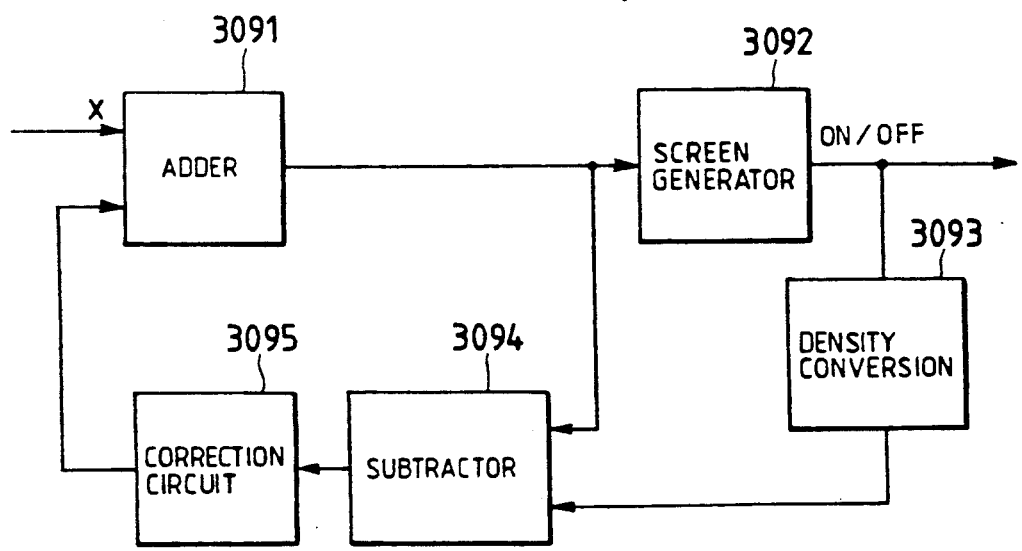
Figure 6A:
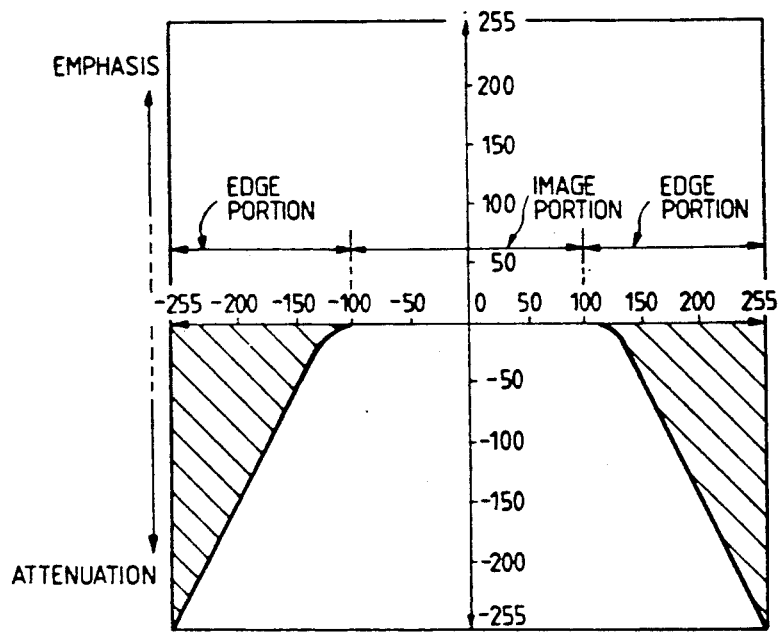
Figure 6B:
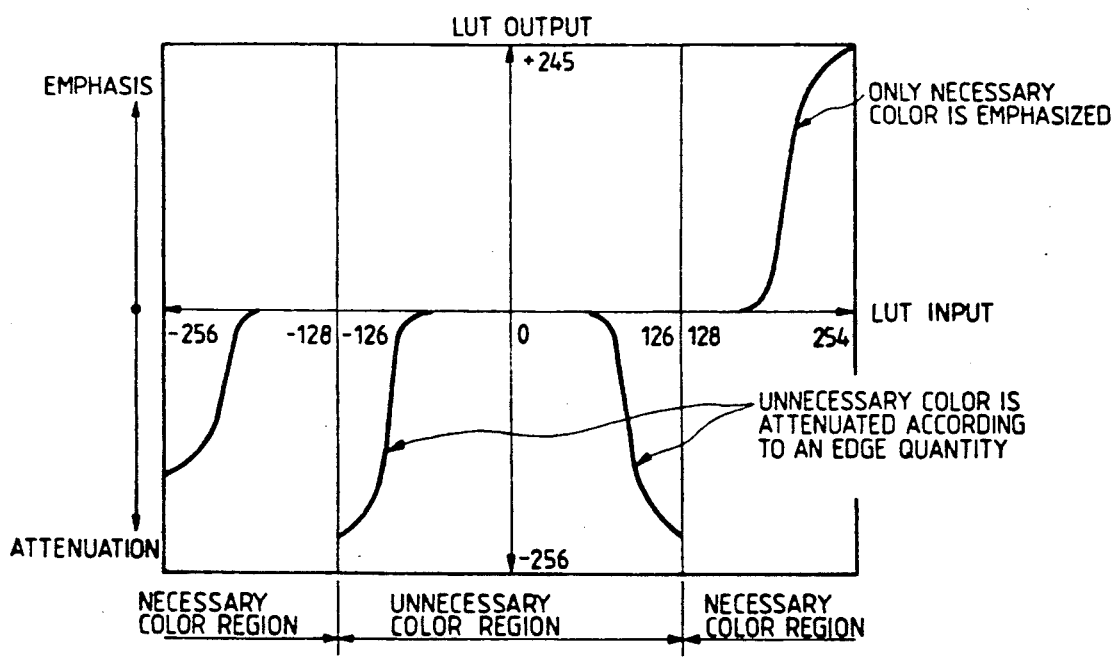
Figure 7A:
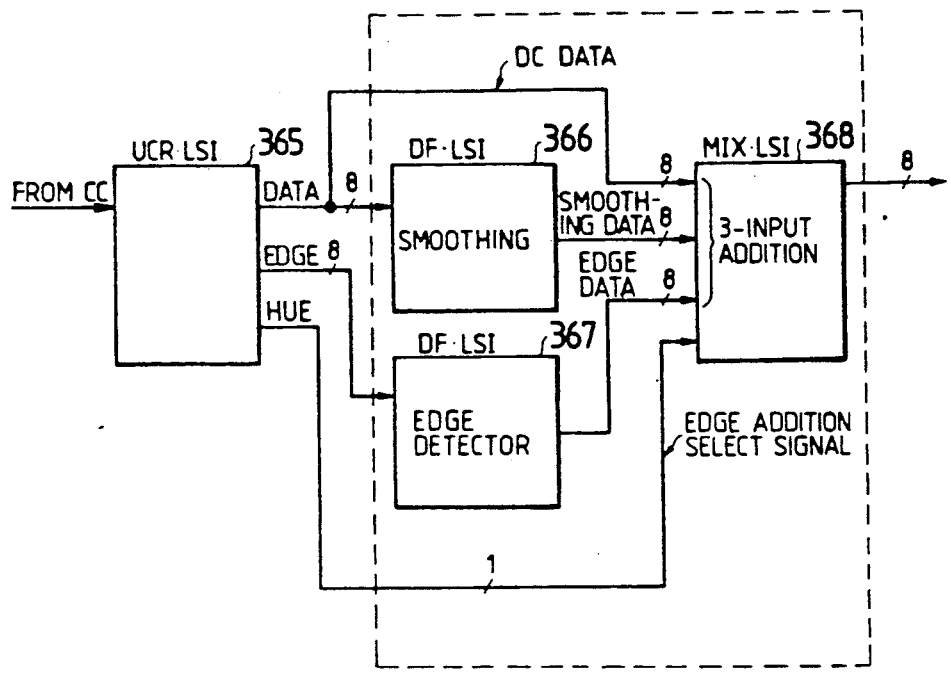
Figure 7B:
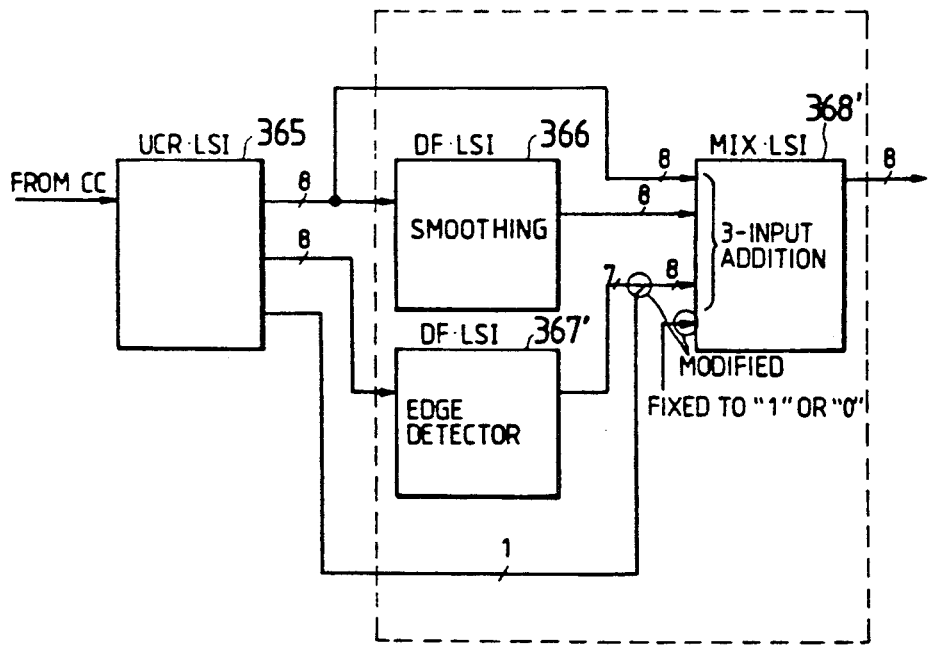
Figure 9:
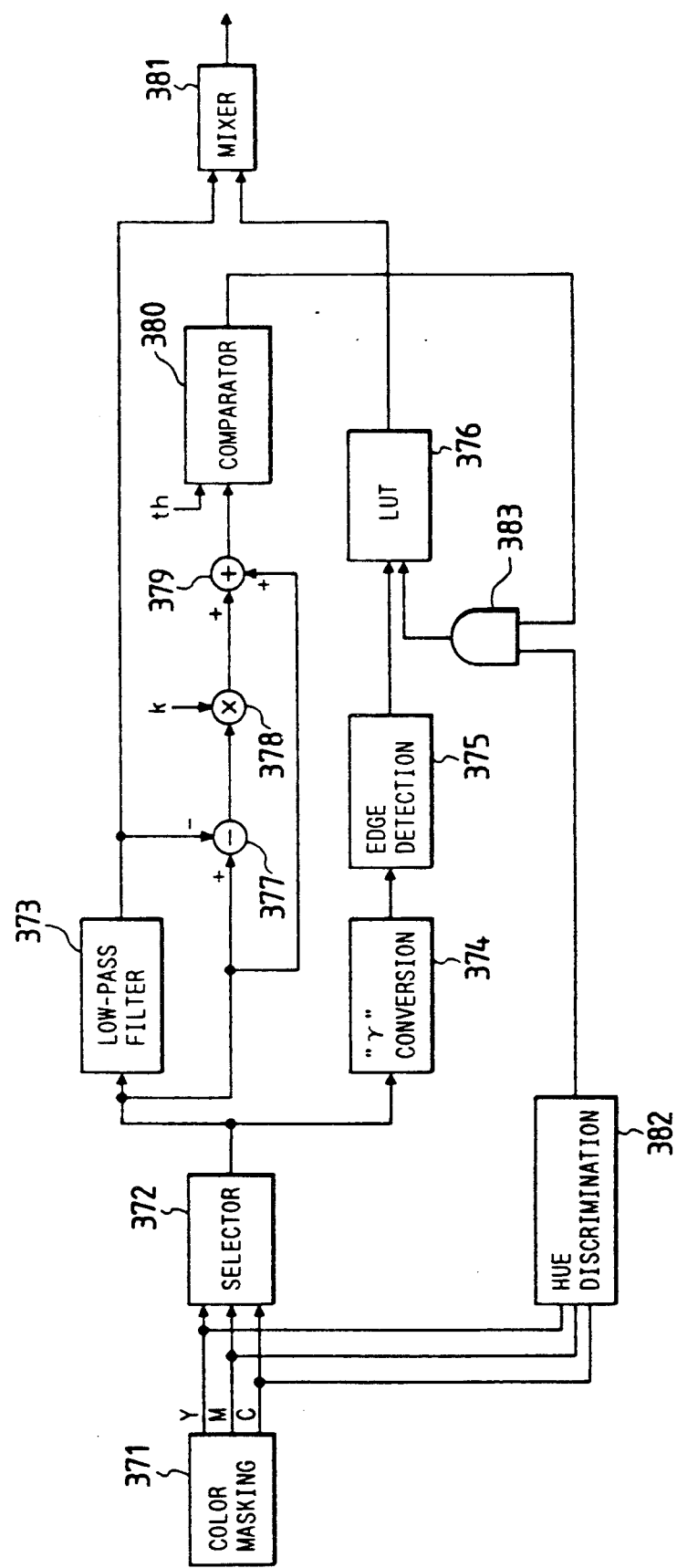
Figure 11:
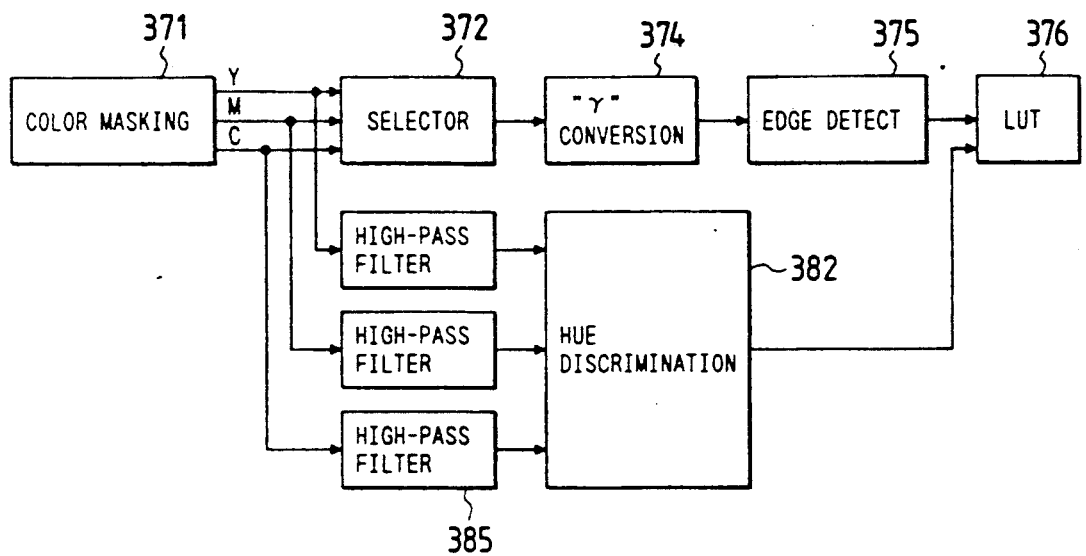
Figure 12:
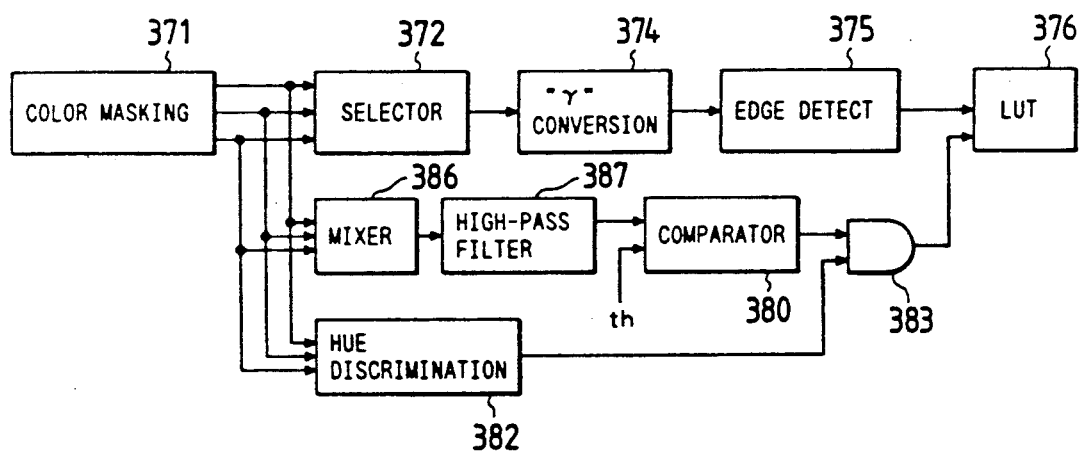
Figure 14A:
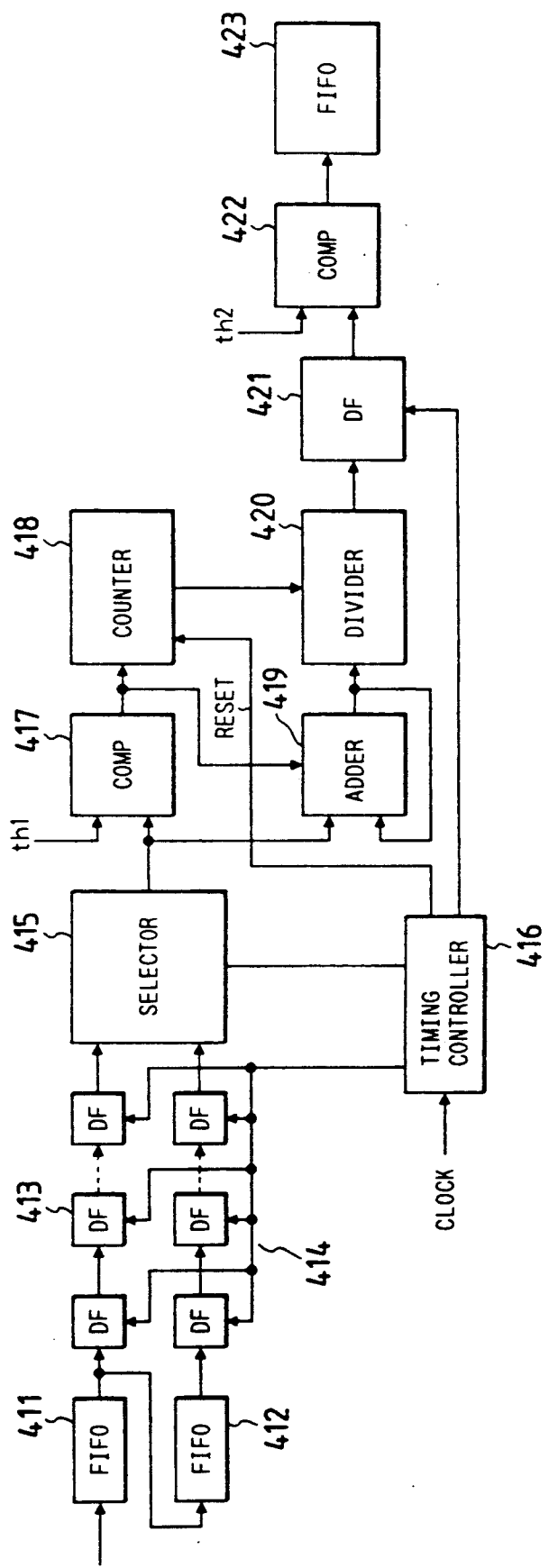
Figure 14B:
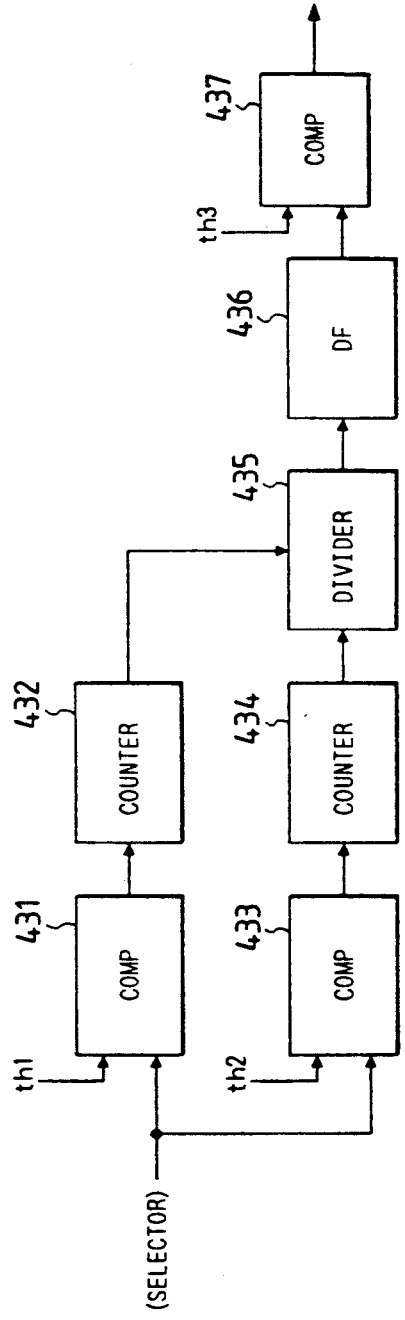
Figure 14C:
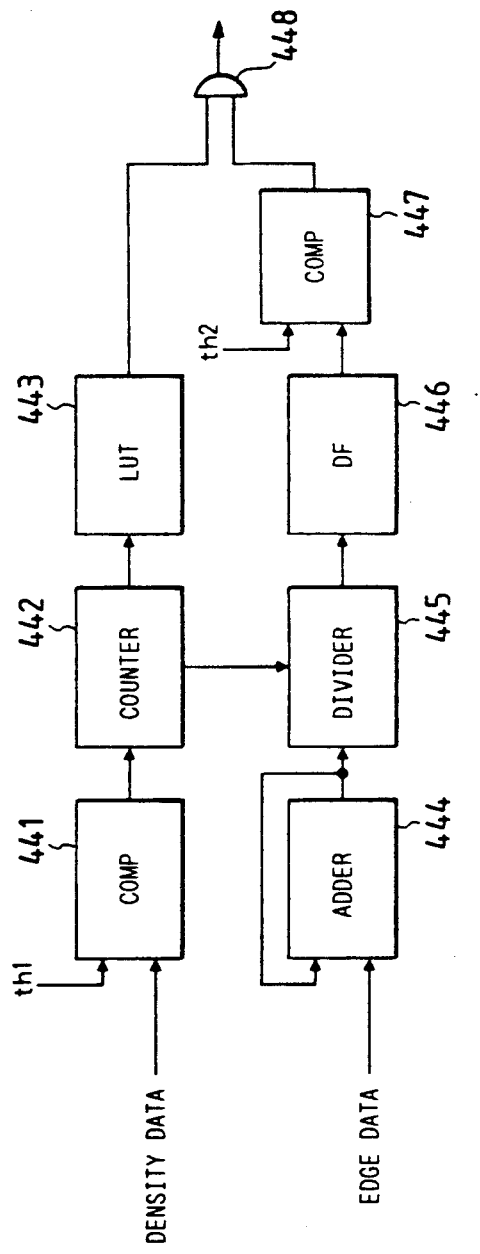
Figure 17:
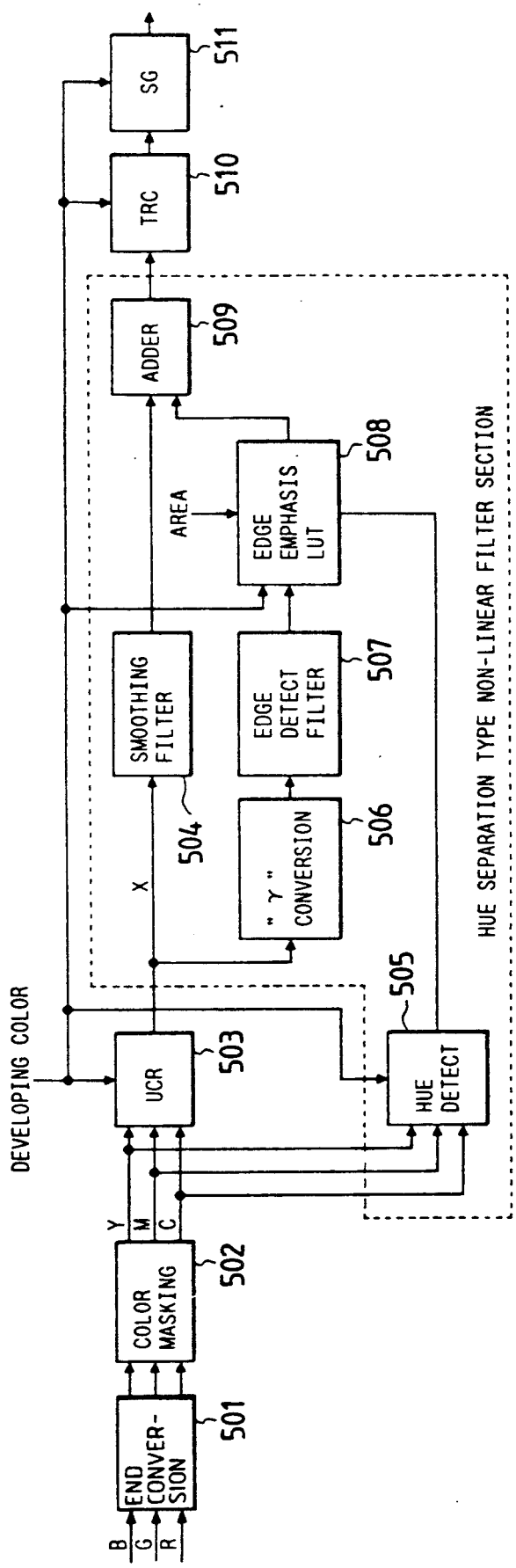
Figures 19A, 19B, 19C:
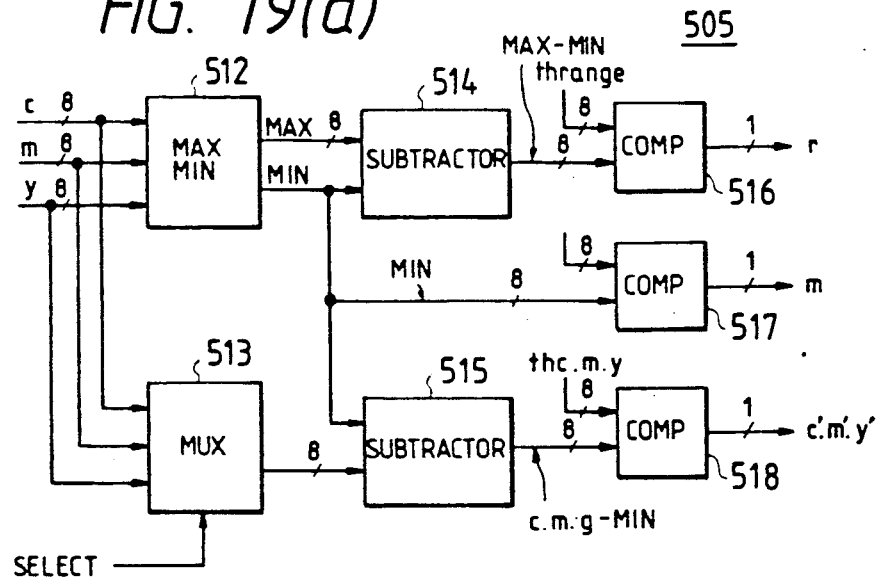

FIGS. 3(a) through 3(q) are explanatory diagrams for explaining the respective modules of the IPS;

FIGS. 4(a) through 4(d) show a hardware configuration of the IPS;

FIGS. 5(a) through 5(d) show block diagrams for explaining an embodiment of an edge processing system according to the present invention;

FIGS. 6(a) and 6(b) graphically show an arrangement of an edge processing LUT;

FIGS. 7(a) and 7(b) are block diagrams showing hardware arrangements of a non-linear filter section, which is constructed with LSIs;

FIGS. 8(a) through 8(g) are explanatory diagrams for explaining the operation of the circuit shown in FIGS. 7(a) and 7(b);

FIG. 9 is a block diagram showing an arrangement of a first embodiment of a sharpness improving system for an image processor according to the present invention;

FIGS. 10(a) through 10(c) are diagrams useful in explaining the sharpness improvement;

FIGS. 11 and 12 are block diagrams showing arrangements of other embodiments of a sharpness improving system for an image processor according to the present invention;

FIGS. 13(a) through 13(e) are block diagrams for explaining an embodiment of an area discriminating method for an image processing system according to the present invention;

FIGS. 14(a) through 14(c) are block diagrams of a large area discriminating circuit based on the fixed block discrimination method;

FIGS. 15(a) and 15(b) are explanatory diagrams for explaining the variable block discrimination method for making a distinction between the different image areas on the basis of the edge interval;

FIG. 16 is a block diagram showing an arrangement of a large area discrimination circuit using the variable block discrimination method;

FIG. 17 is a block diagram showing an arrangement of a digital color image processing system;

FIG. 18 is a block diagram showing an arrangement of a conventional edge processing circuit;

FIGS. 19(a) through 19(c) are block diagrams showing an arrangement of a hue detect circuit;

FIGS. 20(a) through 20(c) are a graph and explanatory diagrams, useful in explaining a character widening phenomenon; and FIGS. 21(a) through 21(c) are explanatory diagrams for explaining edge emphasis processing.

DETAILED DESCRIPTION OF THE PREFERRED EMBODIMENT

Figure 1:
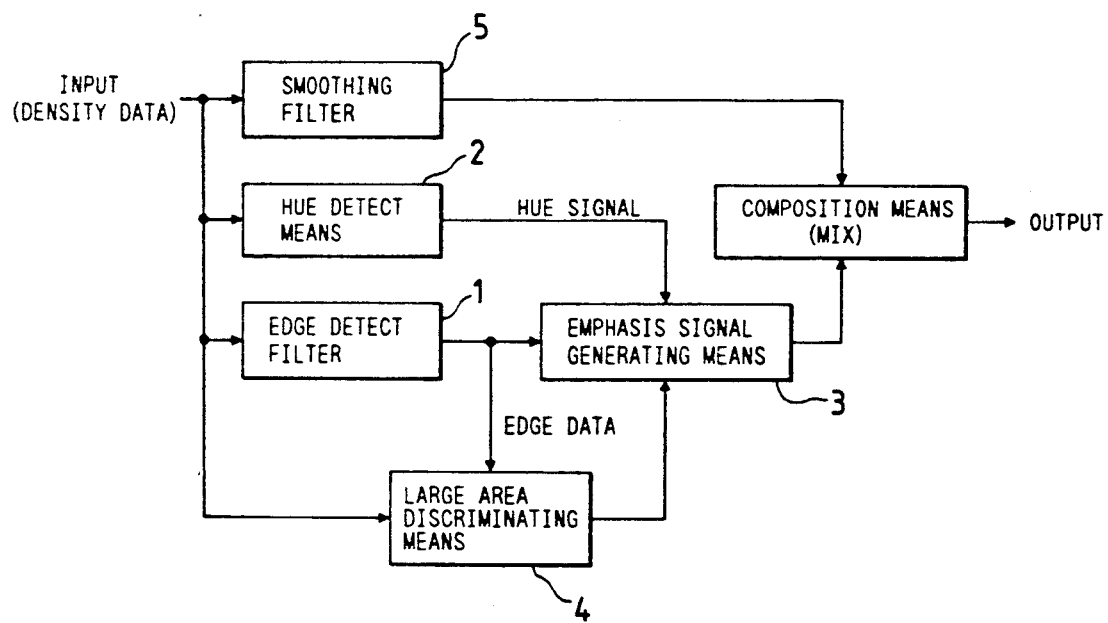
FIG. 1 is a block diagram showing an arrangement of an embodiment of an area discriminating system for an image processing system according to the present invention.

An area discriminating system for an image processing system, as shown in FIG. 1, includes an edge detect filter 1 as a high-pass filter for detecting an edge quantity of a high frequency component. A hue detecting circuit 2 detects hues, and an emphasis signal generating circuit 3 generates an emphasis signal for edge portions on the basis of the output signal of the hue detect circuit 2 and the edge detect filter 1.

The image processing system controls the reproductivity of an image according to the type of image by properly selecting parameters of the emphasis signal generating circuit 3 to generate an edge emphasis signal, and combining the edge emphasis signal with the output signal of the smoothing filter 5 to generate a record signal. A large area discriminating circuit 4 discriminates image areas for every block from edge information o each picture element, and selects the parameters of the emphasis signal generating circuit 3 according to an area.

With such an arrangement, even if the area determinations based on the edge information of picture elements are not uniform, since the area discrimination is performed for each block, the nonuniformity of the area determination and mistaken determination can be corrected to improve the accuracy of discrimination.

The large area discriminating circuit 4 calculates an average value of edge quantities of picture elements whose optical density exceeds a predetermined optical density threshold value of, and determines that an image area is a character area or a halftone area depending on whether or not the average value is above or below a threshold value of edge quantity, or when optical density of all the picture elements is above or below a preset density threshold value. The large area discriminating circuit 4 calculates the ratio of the number of picture elements whose density exceeds a preset density threshold value and the number or picture elements whose edge quantity exceeds a preset edge threshold value, and determines the image area to be a character area or a halftone area depending on the calculated ratio. The large area discriminating circuit 4 determines the image area to be a character area or a half tone area depending on the distance between the picture elements having corresponding edge quantities exceeding a preset edge threshold value, and further an average density value or a minimum density value.

Thus, the area discrimination is carried out on the basis of the picture element density and the edge quantity. With such arrangements, the character area featured in that where the background density is low, the edge quantity is larger than the average value, the edge quantity is large, and the like, and can readily be discriminated from the halftone area having opposite features. In the embodiments to follow, a color copying machine will be used as the image processing system. However, it should be understood that printers, facsimile, and other types of image processing apparatuses are involved in the image processing system.

I. IPS MODULES

Figure 2:
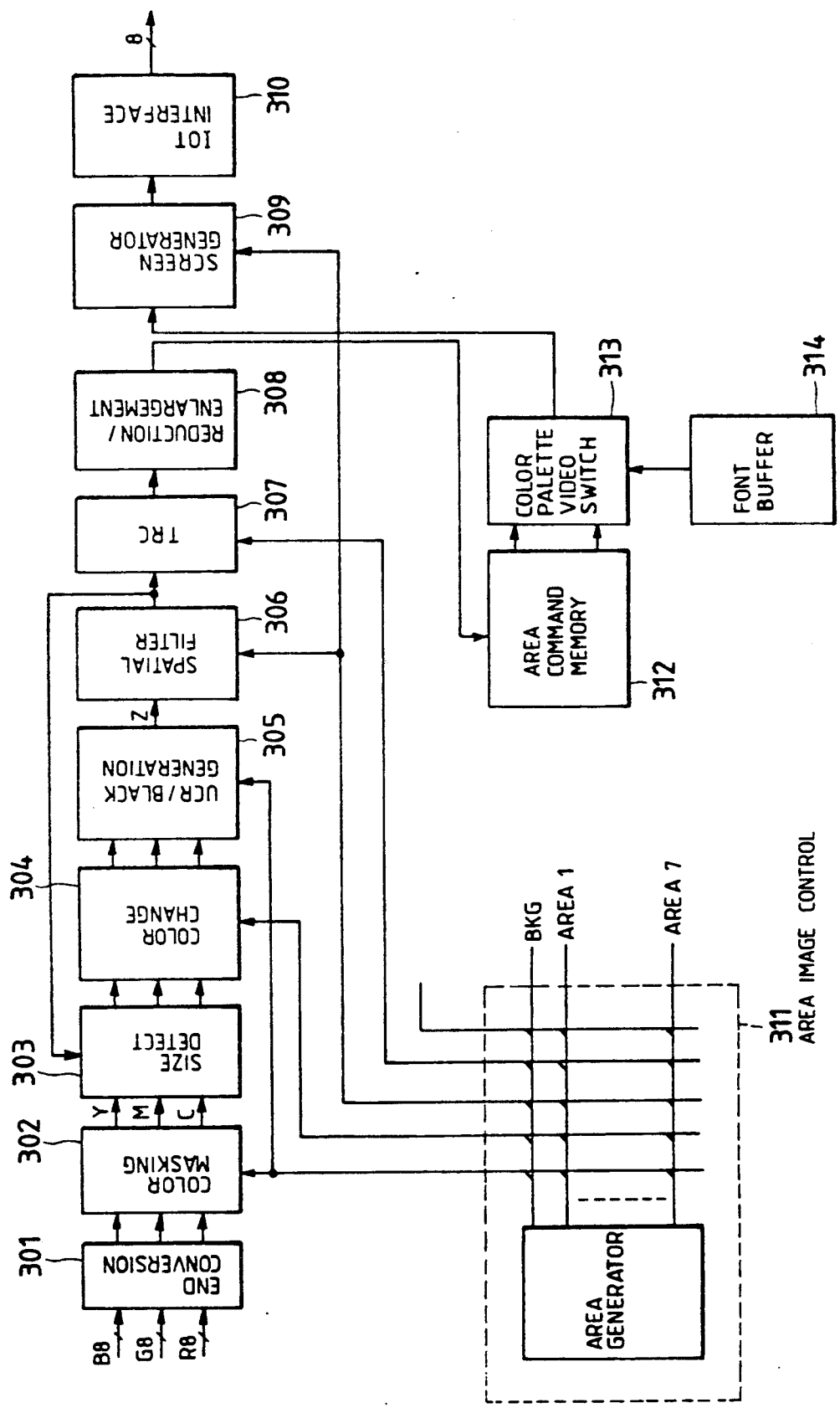
FIG. 2 shows an arrangement of IPS modules in the image processing system.

FIG. 2 shows an arrangement of IPS modules in the image processing system (IPS). In the color image recording apparatus, the IIT (image input terminal) reads a color image on an original in the form of three primary colors, B (blue), G (green) and R (red) by using a CCD image sensor, and converts these to signals of primary toner colors of Y (yellow), M (magenta), C (cyan), and K (black or tusche), and the IOT (image output terminal) performs the exposure by the laser beam and development to reproduce the original color image. In this case, the four separated toner images of Y, M, C and K are used. A copy process (pitch) is performed one time using the process color of Y. Subsequently, the copy processes will be performed for the remaining process colors M, C and K. A total of four copy cycles are executed. The four images consist of mesh points and are superposed to reproduce a single full color image. Accordingly, when the separated color signals of B, G and R are converted into toner signals of Y, M, C and K, a designer encounters the problems how to adjust the color balance, how to reproduce colors in accordance with the read characteristic of the IIT and the output characteristic of the IOT, how to adjust the balance of density and contrast, and how to adjust the emphasis and blur of the edge, and how to adjust for Moire.

The IPS receives the separated color signals of B, G and R, processes the signals to improve the reproducibility of colors, tone, and definition, converts the toner signals of the developing process colors into on/off signals, and outputs them to the IOT. As shown in FIG. 2, the IPS is made up of an END (equivalent neutral density) conversion module 301, color masking module 302, original size detect module 303, color conversion module 304, UCR (under color removal)/black generating module 305, spatial filter 306, TRC (tone production control) module 307, reduction/enlargement processing module 308, screen generator 309, IOT interface module 310, area image control module 311 including an area generator and a switch matrix, and edit control module including an area command memory 312, color palette video switch circuit 313, and font buffer 314.

In the IPS, 8-bit data (256 gray levels) representing each or the separated color signals B, G and R is applied to the END conversion module 301. The module 301 converts the data into the toner signals of Y, M, C and K. A process color toner signal X is selected and digitized. The digitized signals are transferred, as the on/off data of the process color toner signals, from the IOT interface module 310 to the IOT. Accordingly, in the case of full color (4 colors), the prescan is executed to detect an original size, an edit area, and other necessary information of the original. Then, a first copy cycle is executed using Y as the toner signal X of the process color. Then, a second copy cycle is executed using M for the toner signal X. Subsequently, copy cycles will be executed for the remaining process colors. A total of four copy cycles are repeated.

In the IIT, the color components of R, G and B of the image are read by using the CCD sensor, with the size of one pixel being 16 dots/mm. The IIT outputs the read signals as 24 bits of data (3 colors × 8 bits; 256 gray levels). B, G and R filters are laid on the upper surface of the CCD sensor with the density of 16 dots/mm and whose total length is 300 mm. The CCD sensor scans 16 lines/mm at a process speed of 190.5 mm/sec. Accordingly, the sensor produces the read data at the rate of about 15M pixels/sec for each color. The IIT log converts the analog data of B, G, and R pixels to obtain the density data from the reflectivity data, and then digitizes the density data.

The respective modules will be described in detail. FIGS. 3(a) through 3(g) are explanatory diagrams for explaining the respective modules of the IPS.

(A) END Conversion Module

The END conversion module 301 adjusts (converts) the optically read signal of the color original obtained by the IIT into a gray balanced color signal. The amounts of toner of each color are equal when the color is gray. The toner amount of gray is used as a reference toner amount. However, the separated color signals of B, G, and R produced from the IIT when it reads the gray document, are not equal in value, because the spectral characteristics of the light source and the color separation filter are not ideal. These imbalanced color signals are balanced by using a converting table (LUT: look up table) as shown in FIG. 3(a). This balancing work by the LUT is the END conversion. When a gray original is read, the LUT converts the B, G, and R color separated signals into signals at the equal gradation in accordance with a level (black -> white) of the gray image. The LUT depends on the characteristics of the IIT. 16 LUTs are used. Of those LUTs, all 16 tables are used for film projectors including negative films, and 3 tables are used for copy, photograph, and generation copy.

(B) Color Masking Module

The color masking module 302 converts the B, G, and R color signals into signals indicative of toner amounts of Y, M, and C, respectively, through a matrix operation. This conversion is applied to the signals after they are subjected to gray balance adjustment by the END conversion.

In this instance, the conversion matrix for the color masking is a 3×3 matrix exclusively used for converting B, G, and R into Y, M, and C. A matrix capable of dealing with BG, GR, RB, $B^2$, $G^2$ and $R^2$, in addition to B, G and R may also be used. Any other suitable matrix may be used, if necessary. Two sets of matrices are used, one for an ordinary color adjustment and the other for emphasis signal generation in the monocolor mode.

Thus, when the video signal from the IIT is processed by the IPS, the gray balance adjustment is first conducted. If it follows the color masking process, the gray balance adjustment using the gray original must be made allowing for the characteristics of the color masking. This makes the conversion table more intricate.

(C) Original Size Detection Module

Originals to be copied may comprise not only standard size documents, but also patched up documents and others. To select paper of a proper size corresponding to the size of an original, it is necessary to detect the size of the original. In case that the paper size is larger than the original size, if the peripheral region of the original is masked, the resultant copy will be excellent. For this reason, the original size detection module 303 detects the original size at the time of scanning and suppresses the platen color (edge suppress) at the time of scanning to read the original image. Accordingly, a color, for example black, which is clearly distinguished from the original is used for the platen color. The upper limit value and lower limit value for the platen color discrimination are set in a threshold register 3031, as shown in FIG. 3(b). At the time of a prescan, the signal is converted (gamma (r) conversion) into a signal X representing the data approximate to the reflectivity of the original (by using the spatial filter 306 to be described in detail). The signal X is compared with the upper/lower limit value set in the register 3031, by a comparator 3032. An edge detect circuit 3034 detects the edge of the original, and stores the maximum and minimum values of X and Y in the coordinates into a max./min. sorter 3035.

As shown in FIG. 3(d), when the original is slanted or its figure is not rectangular, the maximum values and the minimum values (x1, x2, y1, y2) at four points on the outline of the figure are detected and stored. At the time of scanning to read the original, the comparator 3033 compares the Y, M and C of the original with the upper/lower limit values in the register 3031. A platen color suppress circuit 3036 suppresses the pictorial information outside the edge, viz., the read signal of the platen, to effect the edge suppressing processing.

(D) Color Change Module

The color change module 304 enables a designated color in a specific area of an original to be erased. As shown in FIG. 3(c), this module is made up of a window comparator 3042, threshold register 3041, and color palette 3043. To effect color change, the upper/lower limit values of Y, M, and C of the colors to be changed are set in the threshold register 3041. The upper/lower limit values of Y, M, and C of the converted colors are set in the color palette 3043. According to an area signal applied from the area image control module, the NAND gate 3044 is controlled. When it is not a color change area, the color signals of Y, M, and C of the original are transferred intact from a selector 3045. When the color change area is reached, and the color signals of Y, M, and C of the original are between the upper limit values and the lower limit values as set in the threshold register 3041, the selector 3045 is switched by the output signal of the window comparator 3042 to send the converted color signals of Y, M, and C that are set in the color palette 3043.

As for the designated color, by directly pointing an original by a digitizer, 25 pixels of B, G, and R in the vicinity of the coordinates as designated at the time of prescan are averaged and the designated color is recognized on the basis of the average. By means of the averaging operation, even in the case of an original with 150 lines, the designated color can be recognized with a precision within 5 of color difference. To the B, G and R density data, the designated coordinates are converted into an address and the density data are read out of the IIT shading correction circuit, with that address. In the address conversion, readjustment corresponding to the registration adjustment is needed, as in the case of the original size detection. In the prescan, the IIT operates in the sample scan mode. The B, G, and R density data read out of the shading RAM are subjected to a shading correction by a software, and averaged. Further, the data are subjected to END correction and color masking, and then are set in the window comparator 3042. The registered colors are selected from 1670 colors, and up to eight colors can be simultaneously registered. The reference color prepared include a total of 14 colors, Y, M, C, G, B, and R, colors between these colors, and K and W.

(E) UCR/Black Generation Module

When the color signals of Y, M, and C have equal quantities, gray is produced. Theoretically, the same color can be obtained by replacing the colors of Y, M, and C of equal quantities with black. In this case, however, the color is impure and hence the reproduced color is not fresh. To cope with this problem, the UCR/black generation module 305 generates a proper amount of K to prevent such a color impurity, and equally reduces the toner colors Y, M, and C in accordance with the amount of the generated K (this process is called an under color removal (UCR)). More specifically, the maximum and the minimum values of the toner colors Y, M, and C are detected. A value of K is generated by a conversion table in accordance with the difference between the maximum value and the minimum value. Further, the toner colors Y, M, and C are UCR processed in accordance with the generated K.

As shown in FIG. 3(e), in the case of a color closer to gray, the difference between the maximum and the minimum values is small. Accordingly, the minimum value or its near value of each color Y, M, and C is removed for generating the color K. When the difference is large, the removal quantities of the colors Y, M, and C are set below the minimum values of them, thereby to reduce the quantity of the generated K. In this way, the mixing of tusche into the pure color and the hue degradation of a low gradation, high hue color can be prevented.

FIG. 3(f) shows a specific circuit arrangement of the UCR/black generation module, a max./min. value detector 3051 detects the maximum and the minimum values of the process colors Y, M, and C. A calculating circuit 3053 calculates the difference between the maximum and the minimum values of each color.

A conversion table 3054 and another calculating circuit 3055 cooperate to generate the black value K. The conversion table 3054 adjusts the value of K. When the difference between the maximum and the minimum values is small, the output signal of the conversion table is zero. Accordingly, the calculating circuit 3055 produces the minimum value as intact in the form of the value of K. When the difference is large, the output value of the conversion table 3054 is not zero, the calculating circuit 3055 subtracts the difference from the minimum value and produces the result of the subtraction as the value of K.

A conversion table 3056 provides the values to be removed from the colors Y, M, and C in accordance with the K value. In cooperation with the conversion table 3056, an additional calculating circuit 3059 subtracts the values as defined by the K value from the process colors Y, M, and C. The AND gates 3057 and 3058 operate for the signal K, and the signals of Y, M, and C after UCR processing in accordance with the signals in the monocolor mode and the full color mode. The selectors 3052 and 3050 are used for selecting any of the toner signals Y, M, C, and K by the process color signals. A color is thus reproduced by using the mesh points of Y, M, and C. Accordingly, the curves and tables that are empirically formed are used for the removal of Y, M, and C and for determining the generation ratio of K.

(F) Spatial Filter Module

In the color image recording apparatus incorporating the present invention, the IIT reads an image of an original while the original image is being scanned by the CCD. When the data is used as intact, the resultant data will in effect be faded data. The mesh points are used for image reproduction. Accordingly, Moire occurs between the mesh point period of the printed matter and the sampling period of 16 dots/mm. The same phenomenon occurs between the mesh point period generated by the machine and that of the original. The spatial filter module 306 is provided to remove the above fading and the Moire phenomenon. For the Moire removal, a low-pass filter and for edge emphasis, a high-pass filter are used.

In the spatial filter module 306, as shown in FIG. 3(g), a selector 3003 selects one of the input signals Y, M, C, Min, and Max-Min. A conversion table 3004 converts it into data signals approximately indicative of the reflectivity. Use of this type of data makes it easy to pick up the edge data. In this instance, the selected color signal is Y. A threshold register 3001, 40 bit digitizer 3002, and decoder 3005 separate the color signals Y, M, C, Min, and Max-Min into eight colors, Y, M, C, K, B, G, R, and W (white), for each pixel. A decoder 3005 recognizes the hue in accordance with the digitized data signal, and produces a 1-bit data to indicate whether the color is a necessary process color or not.

The output signal of the circuit of FIG. 3(g) is applied to the circuit of FIG. 3(h). In the circuit, a FIFO buffer 3061, 5×7 digital filter 3063, and modulation table 3066 cooperate to generate the mesh-point removal data. A FIFO buffer 3062, 5×7 digital filter 3064, modulation table 3067, and delay circuit 3065 cooperate to generate edge emphasis data by using the output data of the output circuit of FIG. 3(g). The modulation tables 3066 and 3067 are selectively used in accordance with the copy mode used, such as a photograph copy, character only copy, and photo/character copy.

With regard to edge emphasis, when a green character as shown in FIG. 3(i) (1) is reproduced in the form of a character (2), the colors Y and C are emphasized at the edges as indicated by waveforms (3) and (4), bu the color M is not emphasized as indicated by the solid line of waveform (5). The switching for this is carried out by the AND gate 3068. In this case, if the waveform (5) of M is emphasized as indicated by a broken line, M is emphasized at the edges as shown in a waveform (6) and accordingly the color purity is lost. To switch the emphasis by the AND gate 3068 for each process color, the delay circuit 3065 synchronizes the FIF0 buffer 3062 with the 5×7 digital filter 3064. When a fresh green character is reproduced by using conventional image processing, the magenta M is emphatically mixed into the green character and the color purity is lost. To solve this, the spatial filter module, when recognizing green, outputs the colors Y and C in an ordinary manner, but outputs the magenta M in a manner such that it is not edge emphasized.

(G) TRC Conversion Module

The IOT exercises the copy cycles four times using process colors of Y, M, C, and K in accordance with an on/off signal derived from the IPS (in the case of the full color copy). With this, reproduction of a full color original is realized. Actually, however, to exactly reproduce the colors theoretically obtained through the signal processing, delicate and careful adjustment is required taking the characteristics of the IOT into consideration. The TRC conversion module 309 is used for improving the color reproduction. An address conversion table containing various combinations of Y, M, and C, which is accessed with 8-bit image data, is stored in the RAM, as shown in FIG. 3(j). With use of such a table, the following various functions, such as density adjustment, contrast adjustment, negative/positive inversion, color balance adjustment, character mode, and transparent composition, may be exercised in accordance with an area signal. The bits 0 to 3 of the area signal are assigned to the upper three bits of the RAM address, respectively. In an out-of-area mode, the above functions may be appropriately combined. In this instance, the RAM has a memory capacity of 2K bytes (256 bytes×8 planes), and eight conversion tables. During the IIT carriage return, a maximum of 8 conversion tables are stored every cycle of Y, M, and C. These tables are selectively used in accordance according to the area designation and copy mode used. If the memory capacity of the RAM is increased, there is no need for storing the tables every cycle.

(H) Reduction/Enlargement Module

The reduction/enlargement module 308, as shown in FIG. 3(k), exercises the reduction/enlargement processing by a reduction/enlargement processor 3082 during a period that data X is temporarily stored in a line buffer 3083 and then is transferred therefrom. A resampling generator/address controller 3081 generates a sampling pitch signal and a read/write address for the line buffer 3083. The line buffer 3083 serves as a ping-pong buffer of two lines in which line data is read out of one of one of the lines, while at the same time the next line data is written into the other line. The reduction/enlargement processing in the main scan direction is digitally processed by the reduction/enlargement module 308. For the reduction/enlargement in the vertical scan direction, the scan speed of the IIT is appropriately varied. The scan speed is varied in the range from 2 times to ¼ time, to vary the magnification from 50% to 400%. In the digital processing, when the data is transferred to and from the line buffer 3083, reduction is based on a thin-out interpolation, while enlargement is based on an additional interpolation. When the data lies between the adjacent sampling points, interpolation data is obtained by weighting the in-between data in accordance with the distances of that data to the data located on both sides, as shown in FIG. 3(1). If the data is Xi', for example, the following calculation $$(Xi \times d2) + (Xi+1 \times d1)$$

where $d1+d2=1$, and $d1$ and $d2$ are distances from a sampling point to the data $Xi$ and $Xi+1$ on both sides of the data $Xi'$.

In reduction processing, data is loaded into the line buffer 3083 while interpolating the data. At the same time, the reduced data in the previous line is read out of the buffer, and sent to the succeeding stage. In enlargement processing, the data is loaded into and temporarily stored in the line buffer, while the data is interpolated for enlargement while reading the previous line data out of the line buffer. When the interpolation for enlargement is conducted at the time of writing, a clock frequency must be increased in accordance with magnification. Such an enlargement process, however, allows the same clock to be used for both the read and write operations. Further, the shift image processing in the main scan direction is possible by reading data at a midpoint between one read timing and the next read timing or by delaying the read timing. Repetitive processing is possible by repeatedly reading data. Mirror image processing is also possible when data is read out in the reverse direction.

(I) Screen Generator

A screen generator 309 converts a gradation toner signal of each process color into an on/off or binary toner signal. In the screen generator, the digitizing processing and the error diffusion processing are conducted by comparing a threshold matrix with the gradation data. The IOT receives the binary toner signal, and turns on and off a laser beam to reproduce a halftone image. In this case, the laser beam is elliptically shaped in cross section with its geometry of about 60 μm wide. These figures are selected so as to satisfy the recording density of 16 dots/mm.

The manner for expressing gradation data will first be described. The description to follow is directed to the process for forming halftone cells each of 4×4, for example, as shown in FIG. 3(n). To form the cells, the screen generator sets up a threshold matrix "mm" corresponding to such a halftone cell. Then, it compares the matrix with the gradation data. If the value of data is "5", the screen generator generates signals that are turned on in the squares of the matrix "m" whose figures are less than "5".

The 4×4 halftone cell of 616 dots/mm is generally called a mesh point of 100 psi and 16 gradations. If an image is depicted by such mesh points, the image reproduction is poor. In the present invention, to increase the gradations, the 16 dots/mm pixel is further divided into four in the vertical direction (main scan direction). Accordingly, the laser beam is turned on and off at the 4-times the frequency as shown in FIG. 3(o). The gradation attained is four times that of the conventional gradation method. To this end, a threshold matrix "m'" as shown in FIG. 3(o) is set up in the present invention. Further, if a submatrix method is used, the number of lines will effectively be increased.

The above instance uses the threshold matrices "m" of the type in which the center portion of each halftone cell is used as a sole growth nucleus. In the submatrix method, a pixel consists of a plurality of unit matrices. Each matrix has two growth nuclei or more, as shown in FIG. 3(p). If such a screen pattern design method is used, the number of lines and the gradation may be changed in accordance with bright or dark portions, in such a way that 141 psi and 64 gradations are used for bright portions, and 200 psi and 128 gradations, for dark portions. Such a pattern may be designed while visually judging smoothness in gradation, definition, graininess, and the like.

When the halftone image is reproduced by using the above dot matrix method, the gradation or gray level and the resolution contradictively coexist. For example, if the gray level is increased, the resolution becomes poor. On the other hand, if the resolution is increased, the gray level is decreased. If small threshold data matrices are used, the actually outputted image suffers from quantization error. The error diffusion processing is to improve the gradation reproducibility in such a manner that as shown in FIG. 3(q), the quantization errors of the on/off or binary signal generated by a screen generator 3092 and the input graduation signal are detected by a density converting circuit 3095 and adder 3091, and are fed back by using a correction circuit 3093 and an adder 3091. For example, the corresponding position of the previous line and the pixels on both sides of it are convoluted through a digital filter.

The screen generator changes over the threshold error and a feedback coefficient for the error diffusion processing every original or area in accordance with the type of image, such as halftone images and character images. In this way, the reproduction of images of high graduation and high definition is improved.

J) Area Image Control Module

In the area image control module 311, seven rectangular areas can be set in a priority order in an area generator. Control data relating to the respective areas are set in a switch matrix. The control data includes color change data and color mode data indicative of monocolor or full color, modulation select data of photograph, characters, and the like, select data of TRC, select data of the screen generator, and the like. The control data is used for controlling the color masking module 302, color conversion module 304, UCR module 305, spatial filter 306, and TRC module 307. The switch matrix may be set by software.

K) Edit Control Module

The edit control module executes outline-drawing processing in which an original bearing a circular figure, such as a circular graph (not a rectangular figure) is read, and a specified area whose configuration is indefinite is painted with a specified color. As shown in FIG. 3(m), a CPU bus is clustered with an AGDC (advanced graphic digital controller) 3121, font buffer 3126, logo ROM 3128, and DMAC DMA controller) 3129. The CPU writes encoded 4-bit area commands into a plane memory 3122 through the AGDC 3121, and font is loaded into the font buffer 3126. The plane memory 3122 consists of four memory planes. Each point on an original can be set by 4 bits (one bit of each of planes 0 to 3) in such a manner that for "0000", a command 0 is used to output an original. A decoder 3123 decodes the 4-bit data to commands 0 to 15. A switch matrix 3124 converts the commands 0 to 15 into commands to make jobs of 11 pattern, fill logic, and logo type. A font address controller 3125 generates an address of a font buffer 3126 in accordance with a pattern such as mesh point shade and hatching shade, by using a 2-bit fill pattern signal.

The switch circuit 3127 selects one of document data X, font buffer 3126 and color palette in accordance with a fill logic signal of the switch matrix 3124 and the contents of the original data X. The fill logic is used to fill only background (of original) with a color mesh, to change the color in a specific portion of the image to another color, and to mask or trim a specific portion of the image, and to fill with a color.

As seen from the foregoing description, in the IPS, the read signals from the IIT are subjected to END conversion and the color masking process. The read signals are further subjected to edge suppress and the color change processing, and the under color removal process. A tusche color is generated. Then, the read signals are converted into the signals for the process colors. In the case of the processing, steps such as spatial filter, color modulation, TRC, and reduction/enlargement, it is better to use the process colors data rather than to use the full color data, because the amount of process data is small, and hence the number of conversion tables may be reduced to ⅓. Accordingly, more varieties of the conversion tables may be used, to improve the reproducibility of colors, gradation, and definition.

(II.) IPS HARDWARE

Figure 4A:
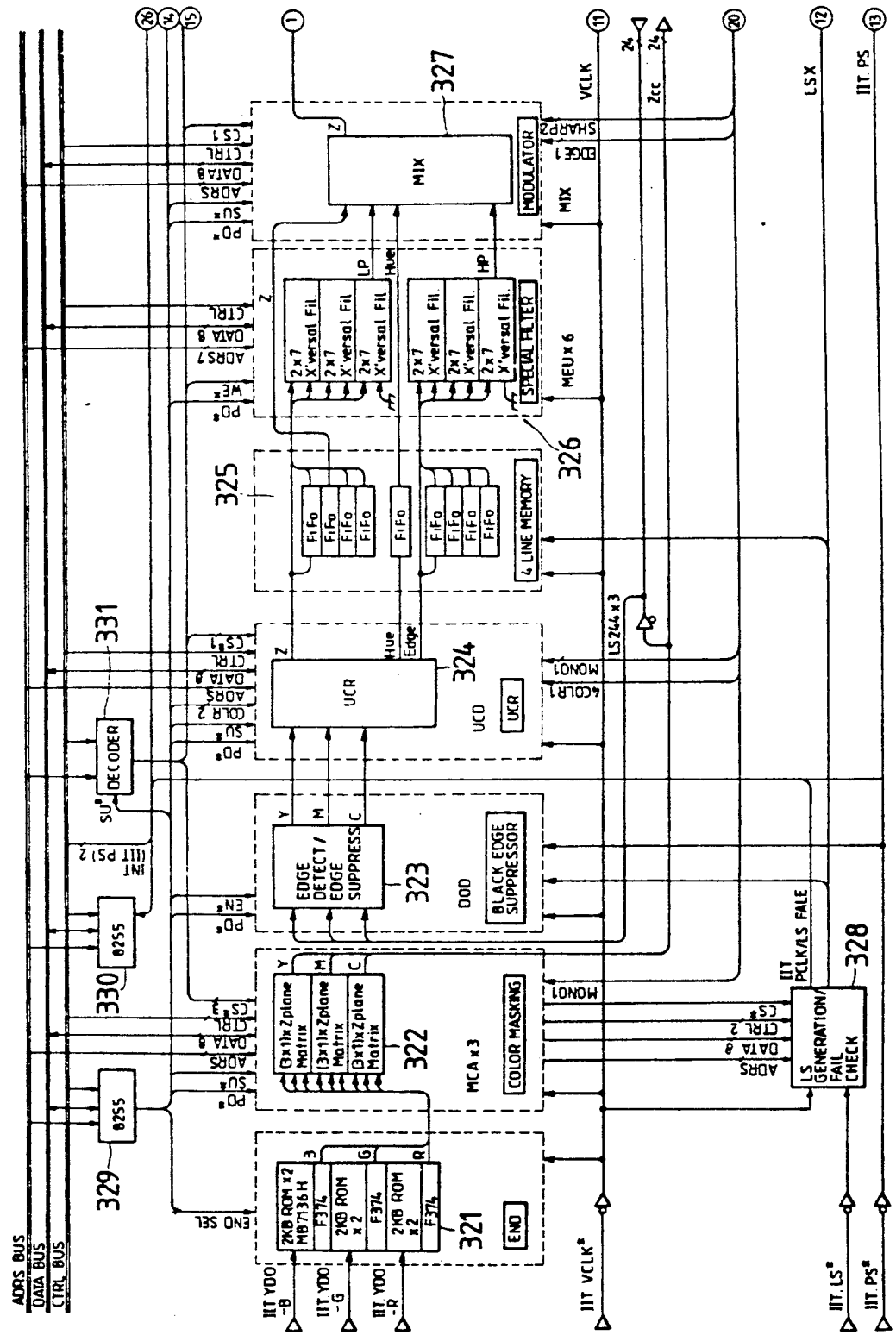
Figure 4B:
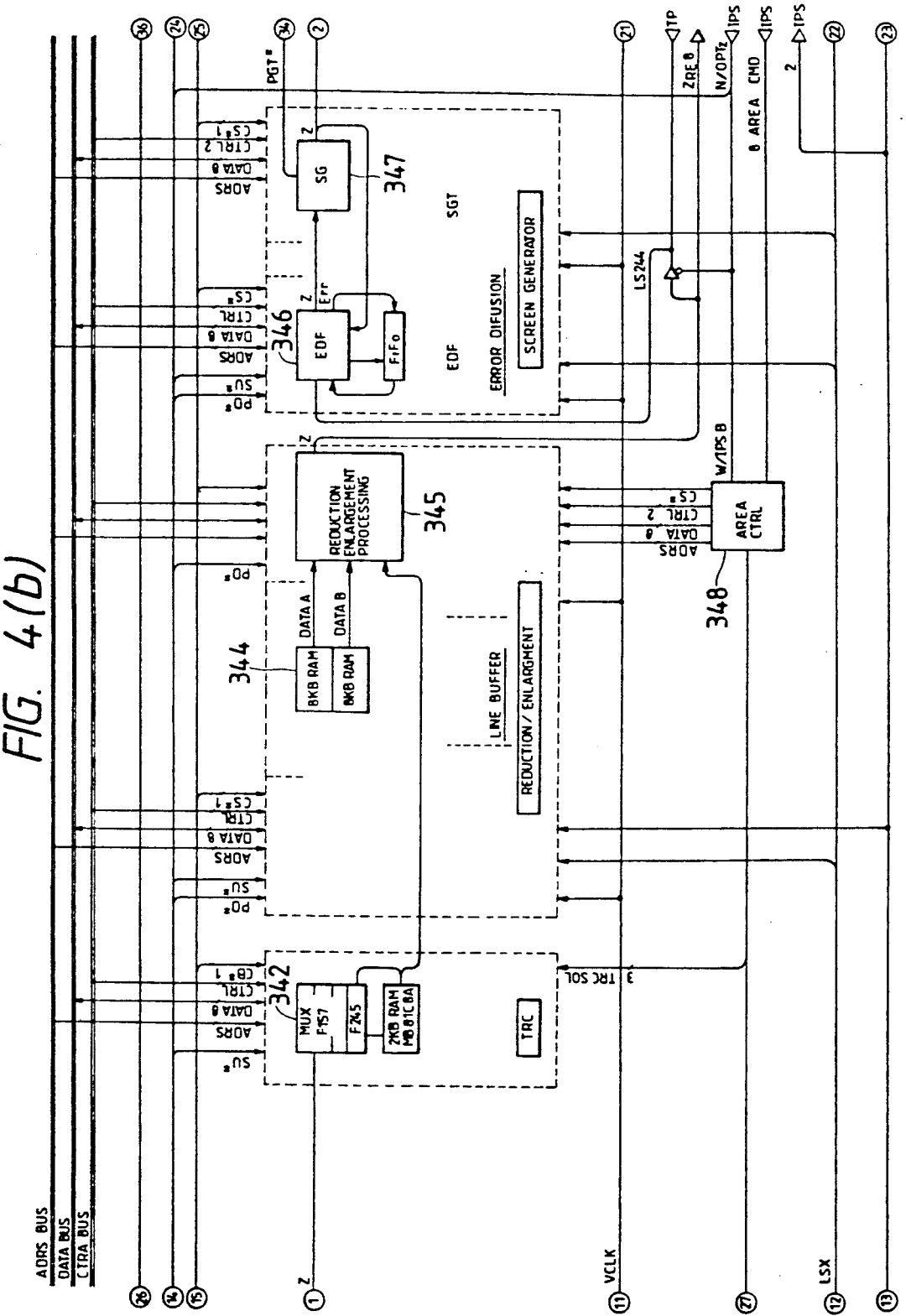
Figure 4C:
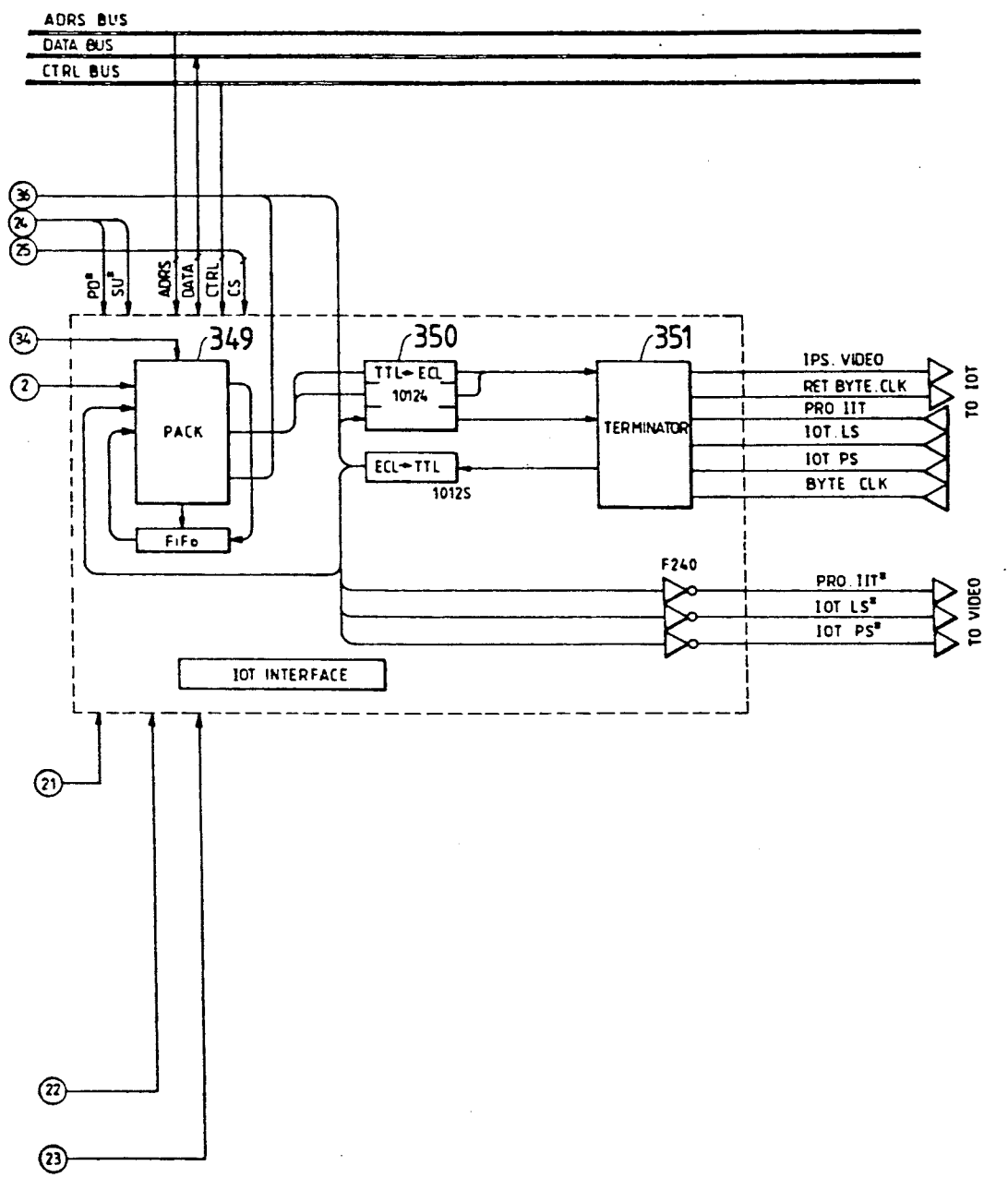
Figure 4D:
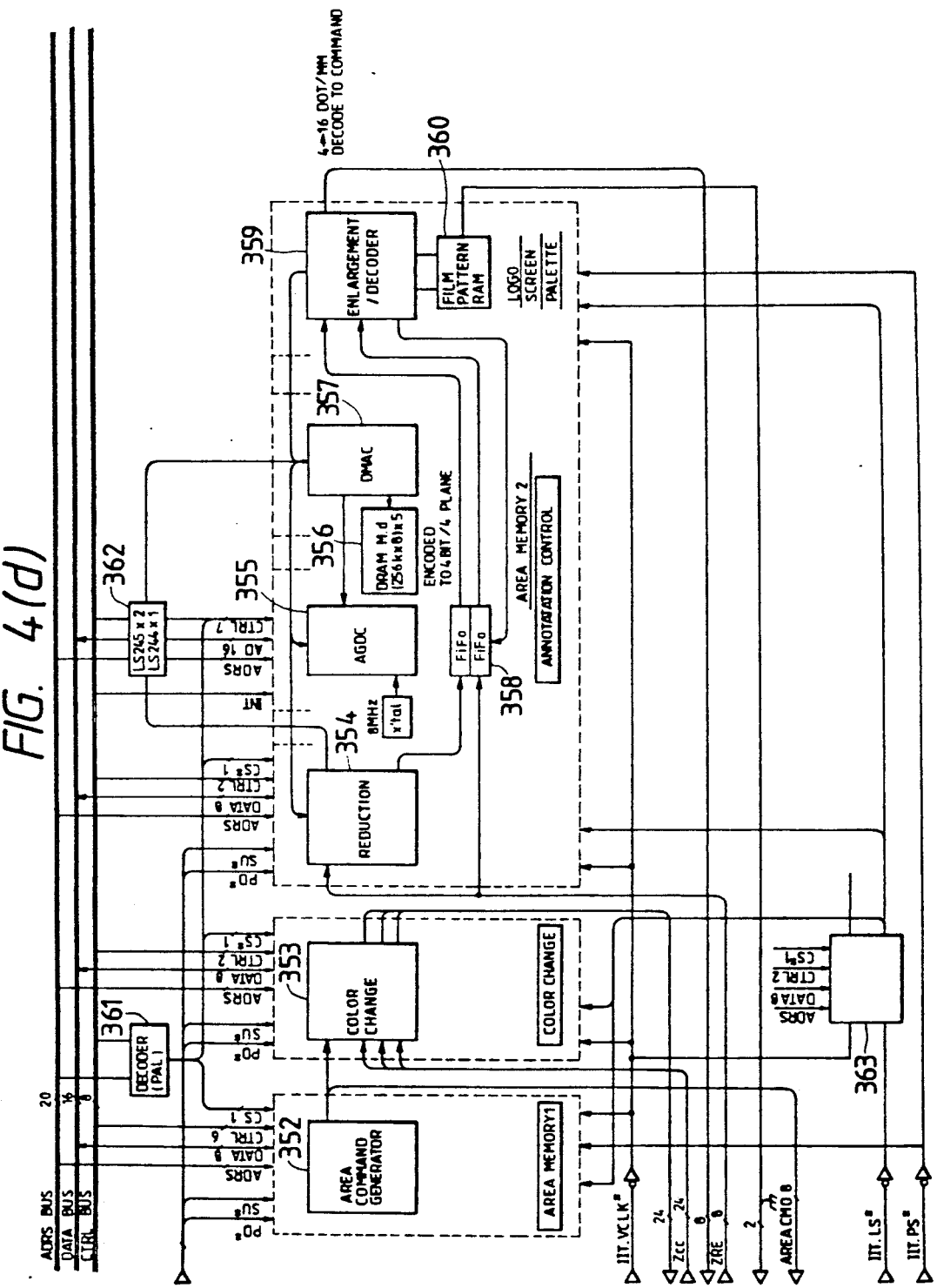

FIGS. 4(a) through 4(d) show a hardware configuration of the IPS. In this instance, the circuitry of the IPS may be divided into two circuit boards IPS-A and IPS-B. The circuit board IPS-A contains circuitry for exercising the basic functions of the color image recording apparatus, such as reproductions of colors, gradation, and definition. The circuit board ISP-B contains circuitry for exercising applications and professional works, such as edit works. An arrangement of circuitry contained in the first circuit board IPS-A is as shown in FIGS. 4(a) to 4(c). A circuit arrangement contained in the second circuit board IPS-B is shown in FIG. 4(d). During the course of using the copier as the color image recording apparatus of the present invention, there will inevitably occur user demands for additional and new applications and professional work. The copier may flexibly cope with such demands by merely modifying and altering only the circuitry of the second circuit board IPS-B, because the basic functions of the copier are secured by the circuitry of the first circuit board.

The IPS boards are coupled with CPU buses including an address bus ADRSBUS, data bus DATABUS and control bus CTRLBUS. The boards are also coupled with video data B, G, and R from the IIT, videoclock IIT VCLK as an async signal, line sync signal (the main scan direction and the horizontal sync) IIT LS, and page sync (vertical scan direction, vertical sync) IIT PS.

The video data is pipeline processed in the stage after the ENC converting unit. Accordingly, the video data is delayed by a delay amounting to the number of clocks required for the respective processing stages in the pipeline processing. A line sync generator/fail check circuit 328 is provided for generating and distributing horizontal sync signals to meet such a situation of delay, and for the fail check of the videoclock and the line sync signal. Therefore, the line sync signal generator/fail check circuit 328 is coupled with the video clock IIT VCLK and the line sync signal IIT LS. To change the settings of the circuit 328, it is coupled with the CPU buses (ADRBUS, DATABUS and CTRLBUS), and a chip select signal CS.

The video data B, G, and R from the IIT are inputted to the ROM 321 in the END converting unit. The END conversion table may be loaded into a RAM, for example, under control of the CPU. Actually, however, when use of the copier progresses, there seldom occurs a situation that the END table must be altered when the image data is being processed. For this reason, two ROMs of 2K bytes are used for each of the END conversion tables of B, G, and R. That is, this instance employs a LUT (look-up table) system using the ROMs. 16 conversion tables are provided and selectively used by a 4-bit select signal ENDSel. The END converted data signal outputted from ROM 321 is coupled with a color masking unit made up of three calculation LSI322 each having two planes each of 3×2 matrix for each color. The calculation LSI 322 is coupled with the CPU buses.

The coefficients of the matrices may be set in the calculation LSI 322 from the CPU. The LSI 322 is coupled with a set-up signal SU and a chip select signal CS. These signals are used for connecting the calculation LSI 322 having processed the image signals to the CPU buses so as to allow the CPU to reprogram the settings in the LSI 322. A 1-bit select signal MONO is coupled with the calculation LSI 322 for selection of the matrices. The LSI 322 further receives a power down signal PD. When no scan is made in the IIT, viz., no image processing is performed, the internal video clock is stopped by the power down signal PD.

The Y, M, and C signals that have been converted from the color image signals B, G, and R by the LSI 322, are applied to a color change LSI 353 in the second circuit board IPS-B shown in FIG. 4(d). Here, the colors of these signals are changed, and inputted to a DOD LSI 323. The color change LSI 353 contains four color change circuits each consisting of a threshold register for setting the not-changed colors, a color palette circuit for setting changed colors, and a comparator. The DOD LSI 323 contains an original edge detector, black edge suppressor, and the like.

The black edge suppressed data signal outputted from the DOD LSI 323 is applied to an UCR LSI 324. This LSI contains an UCR circuit, black generating circuit, and necessary color generators. The LSI 324 produces a process color X corresponding to the toner color, necessary colors Hue, and edge signal Edge. Accordingly, this LSI also receives a process color designating signal COLR and color mode signals (4COLR, MONO).

The line memory 325 consists of two types of FIFO buffers. The first type of FIFO buffer is used for storing data of 4 lines in order to transfer the signals of the process color X, necessary colors Hue, and edge Edge to a 5×7 digital filter 326. The second FIFO buffer is for adjusting for the delays caused by the first FIFO buffer. The process color X and edge Edge signals of 4 lines are stored, and at a total of five lines of those data signals are transferred to the digital filter 326. The data signal of the necessary color Hue is delayed by the FIFO, to synchronize it with the output data signal of the digital filter 326, and then is transferred to a MIS LSI 327.

The digital filter 326 consists of two 5×7 filters (lowpass filter LP and high-pass filter HP) each consisting of three 2×7 filter LSIs. One of the 5×7 filters is used for processing the process color, X, and the other, for processing the edge Edge data signal. The MIS LSI 327 applies the mesh-point removal and the edge emphasis to these output data signals by using the conversion tables, and the processed data signals are mixed into the process color X. The LSI 327 receives an edge EDGE signal and a sharp Sharp signal for switching the conversion tables one another.

The TRC 342 consists of a RAM of 2K bytes containing light conversion tables. The conversion table may be reprogrammed during the return period of the carriage before each scan. A 3-bit select signal TRSel is used for selecting any of the conversion tables. The data processed by the TRC 342 is transferred to a reduction/enlargement LSI 345 by a transceiver. In the reduction/enlargement unit, a couple of RAMs 344 of 8K bytes constitute a ping-pong buffer (line buffer). The LSI 343 generates resampling pitches, and the addresses for the line buffer.

The output data of the reduction/enlargement unit returns by way of an area memory portion in the second circuit board of FIG. 4(d). An EDF LSI 346 contains a FIFO buffer retaining the data of the previous line, and exercises an error diffusion processing by using the previous line data. A signal X after error diffusion processing is outputted to an IOT interface by way of an SG LSI 347 in a screen generator unit.

In the IOT interface, the signals outputted from the SG LSI 347, which received the signals in the form of 1-bit on/off signals are packed into an 8-bit data signal, and are sent in parallel to the IOT.

In the second circuit board of FIG. 4, the data signal actually flowing in the board are for the 16 dots/mm record density. Because of this, a reduction LSI 354 reduces the data into ¼, digitizes the data, and finally stores the data into an area memory. An enlargement decode LSI 359 contains a fill pattern RAM 360. When reading the area data out of the area memory to generate a command, the LSI 359 expands the data into the 16 dots/mm data. By using the expanded data, it generates a log address, color palette, and filter pattern. A DRAM 356, consisting of four planes, stores coded area data of 4 bits. An AGDC 355 is a controller exclusively used for controlling the area commands.

(III) EDGE PROCESSING

The digital color copying machine handles various types of originals, which include photographs, meshdot printings, characters and lines. As described in reference to the "Spatial Filter Module," in the image processor according to the present invention, the reproduction quality of each type of the image is improved by properly mixing an edge emphasis signal and a smoothing signal.

FIGS. 5(a) through 5(d) show block diagrams for explaining an embodiment of an edge processing system according to the present invention. FIGS. 6(a) and 6(b) graphically show an arrangement of an edge processing LUT.

The edge processing circuit according to the present invention is made up of an edge detect filter 361 as a high-pass filter, a hue detect circuit 362 for detecting the hue of an original image signal, and an edge processing LUT 363 for converting an edge detect signal, which includes an edge emphasis LUT (lookup table) (1) and an edge attenuating LUT (2). The edge processing circuit detects an edge of the color signal, and emphasizes the edge for necessary colors while attenuating the edge for unnecessary color 5.

A select signal applied to the hue detect circuit 362 is indicative of either of the two types of developing colors, the necessary color and the unnecessary color. The necessary color select signal selects the edge emphasis LUT (1) of the edge processing LUT 363. The unnecessary color select signal selects the edge attenuating LUT (2). When the edge emphasis LUT (1) is selected, the edge detect signal is changed to a signal to emphasize the edge in the edge processing LUT 363. When edge alternating LUT (2) is selected, the edge detect signal is changed to a signal to attenuate the edge. In this way, when the edge is detected, if the developing color is necessary, the edge is emphasized. If it is unnecessary, the edge is attenuated.

In the edge processing LUT 363, the abscissa represents an output value of the edge detect filter, viz., a degree of the edge, while the ordinate represents an output value of the LUT. When the output value of the filter is within the range of +100, the LUT 363 decides that the halftone image is present, and sets an emphasis quantity at "0." When it is outside the range, the LUT 363 decides that the edge portion is present, and produces an emphasis value or an attenuating value. Accordingly, the edge attenuating LUT (2) produces an attenuating value when the output value of the filter is outside the range of ±100. That is, in this case, an output value of the LUT is selected so that the input signal is emphasized in the negative direction (attenuated) according to an edge quantity.

Figure 5A:
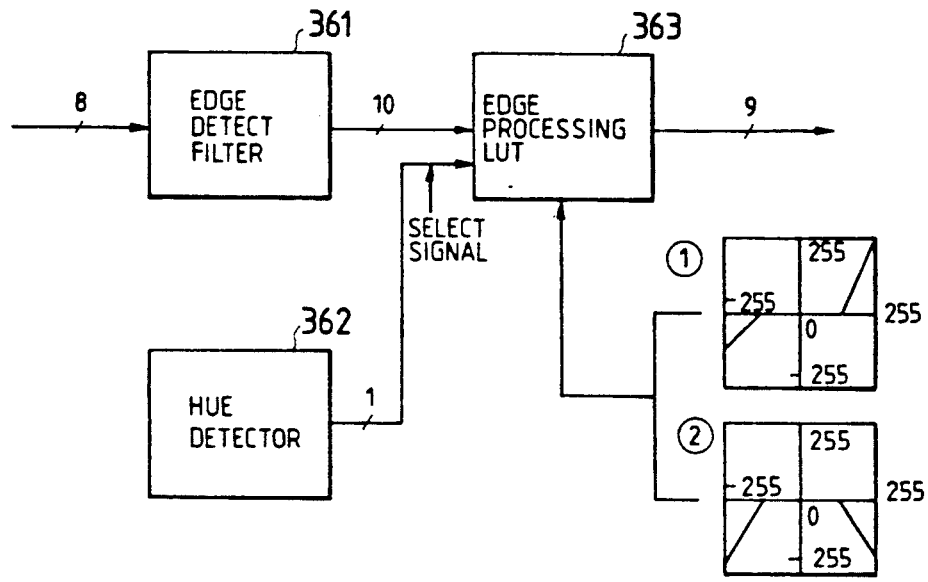
Figures 5B, 5C, 5D:
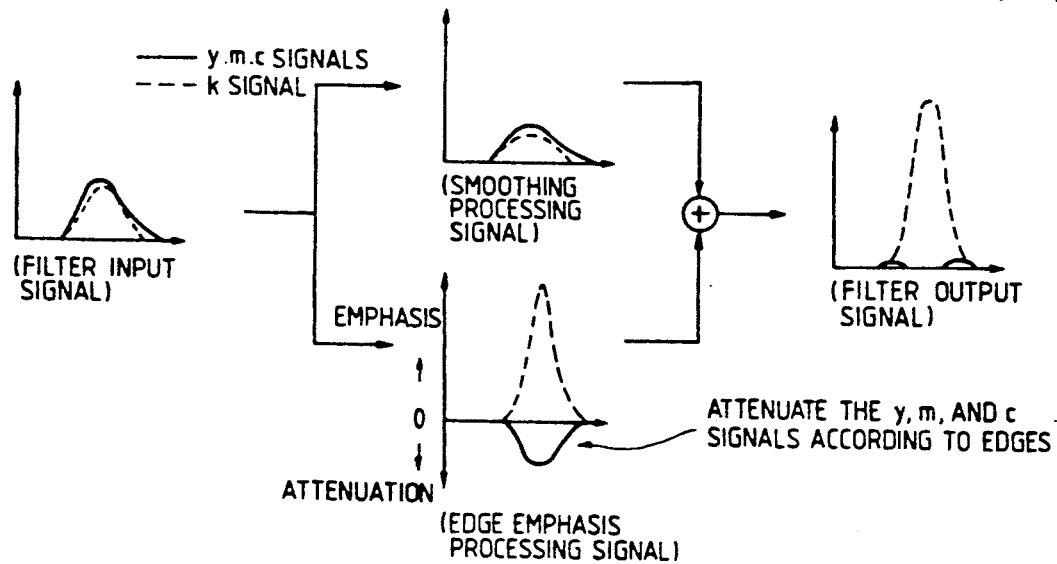

With such an arrangement, as shown in FIG. 5(b), for example, the edge processing circuit processes the filter input signal of black in such a way that, as shown in FIG. 5(c), the black is emphasized, while the colors of Y, M, and C, are not emphasized on the decision that those are the necessary colors, and attenuates them according to an edge quantity. It is the edge processing LUT 363 that converts the edge detect signal into an edge processing signal to emphasize the input signal of the necessary color according to an edge quantity and to attenuate the input signal of the necessary color. Meanwhile, a smoothing circuit generates a smoothing signal for each color, as shown in FIG. 5(c). Accordingly, in the sooothing signal, the edge portion of each color is dull. This portion is combined with the edge emphasis processing signal, to form a filter output signal containing little of the unnecessary colors, as shown in FIG. 5(c).

As a consequence, the black character can be reproduced substantially with a single color of K. Accordingly, the color impurity in the edge portion as referred to in item (F) in Section (I), is removed. For the colors of Y, M, C, K, B, G, R, and W, the reproduced characters are free from the color impurity in the edge portion. The two edge processing LUTs may be compressed into a single LUT. This is illustrated in FIG. 6(b). In this instance, when applied to the data of 256 gray levels, 128 gray levels as the half of the data are used, and the minimum resolution is set at 2 gray levels. With this, a range of −126-0 −+126 is assigned to an unnecessary color region for attenuation. A range of −256 to −128 and a range 128 to 254, which are located outside the above range, are assigned to a necessary color region for emphasis.

FIGS. 7(a) and 7(b) are block diagrams showing hardware arrangements for a non-linear filter section, which is constructed with LSIs. FIGS. 8(a) through 8(g) show explanatory diagrams for explaining an operation of the circuits shown in FIG. 7. In this instance, UCR.LSI 365 separates a print color signal "data" into an edge signal "edge" and a necessary color (hue) signal "Hue," and applies those separated signals respectively to digital filters 366 and 367.

Figure 8A:
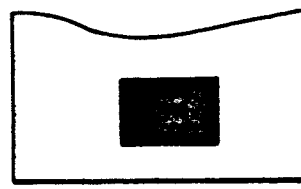
Figure 8A:
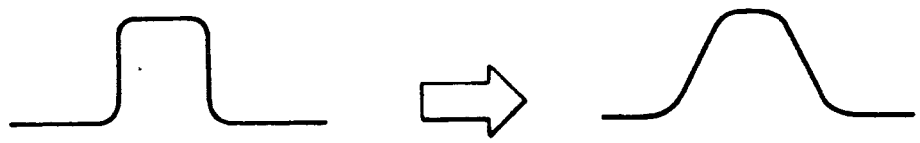
Figure 8B:
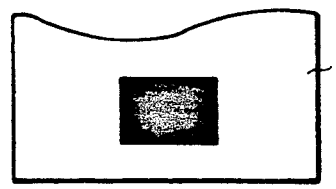
Figure 8B:
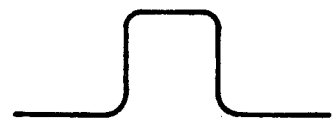
Figure 8B:
Figure 8B:
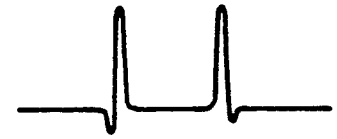
Figure 8C:
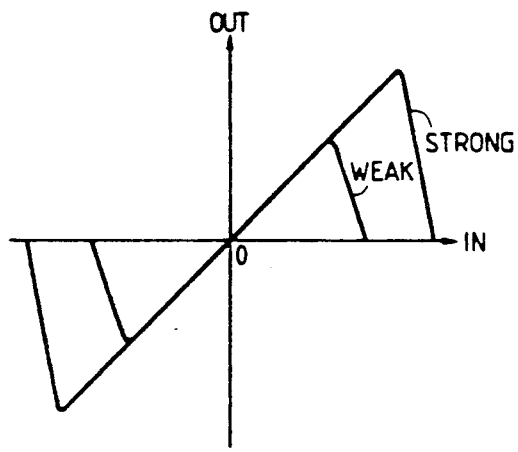
Figure 8D:
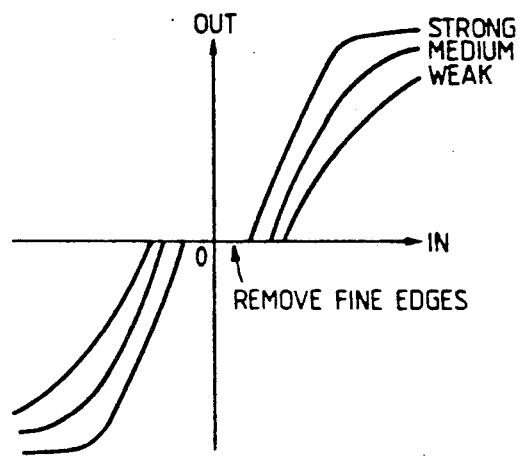
Figure 8E:
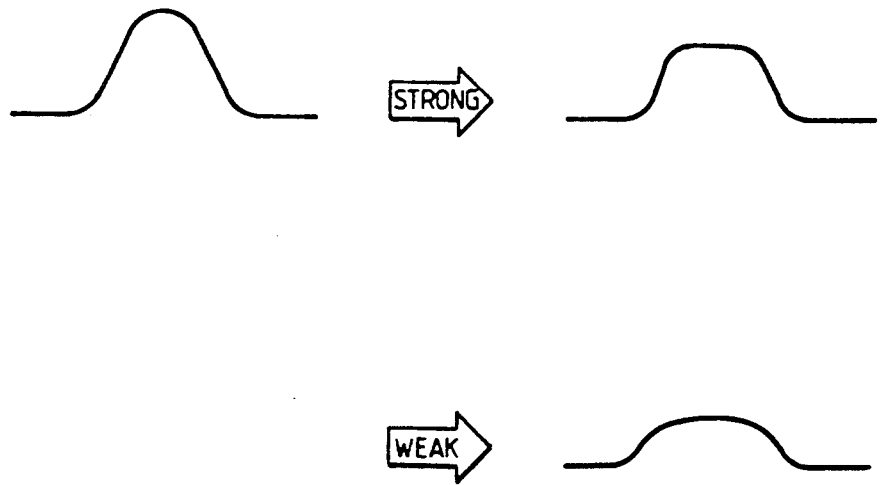
Figure 8F:
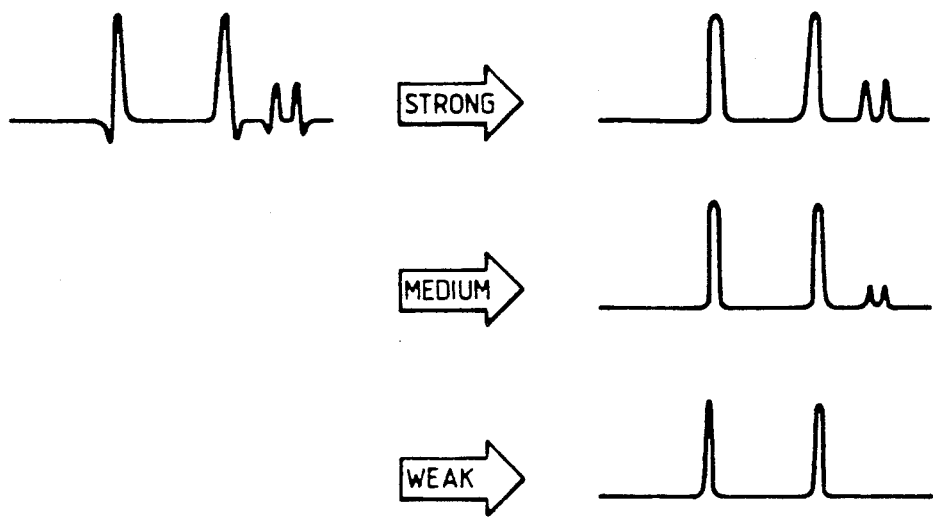

The digital filter (ME-LUT) 366 acts as a low-pass filter to deempathize the edge portions of the image data signal, as shown in FIG. 8(a). The sharpness adjustment is realized by changing the characteristic by appropriately selecting parameters. The digital filter (SM-LUT) 367 as a high-pass filter has a characteristic to pick up the edge portions as shown in FIG. 8(b). The output signals of the digital filters 366 and 367, and the necessary color signal "Hue" are input to a MIS.LSI 368 and are mixed. The MIX.LSI 368 includes a smoothing LUT (ME-MODU-LUT) and an edge processing LUT (USM-MODU-LUT]. The smoothing LUT contains two tables, one for high and the other for low, as shown in FIG. 8(c). It modulates the signal according to high and low values, as shown in FIG. 8(e). The edge processing LUT contains three tables, first for high, second for medium, and third for low, as shown in FIG. 8(d). It modulates the signal according to the high, medium, and low values, as shown in FIG. 8(f). As already described, in each edge processing LUT, the edge emphasis or the edge attenuating LUT is selected according to a signal "Hue."

FIG. 7(a) shows a circuit arrangement applicable for the circuit of FIG. 18 or FIG. 5 in which two LUTs are provided and one of them is selectively used according to one of three situations, the first is when the signal is subjected to an addition after being passed through the edge emphasis LUT, the second is when the signal is set to 0 and directly applied to the adder, and the third is when the signal is subjected to an addition after being passed through the edge attenuating LUT. In a circuit arrangement shown in FIG. 7(b), the data width of the data signal outputted from the digital filter 367' is reduced by 1 bit. Instead of this, hue signal "Hue" of 1 bit is added to the output data. The resultant data of 8 bits is used as input data to the MIX.LSI 368'. In the MIX.LSI 368', the edge addition control is carried out by using a single LUT (as shown in FIG. 6(b)) as a necessary color region (emphasis LUT) or an necessary color region (attenuating LUT) according to the on/off state of the hue signal "Hue."

In the case where the data outputted from the edge detector 367' consists of a 1-bit sign "s" (+ or −) and 7-bit data (d6d5d4d3d2d1d0), the least significant bit "d0" is removed, the whole data is shifted to the right by one bit, and a signal "Hue" is added to the most significant bit of the shifted data. The input data after the bit sign is changed to 8-bit data is "Has5d4d3d2d1d0".

If this instance is applied to the prior edge emphasis processing circuit shown in FIG. 18, the edge attenuating LUT cannot be used for the unnecessary color, because the edge data is added after being passed through the emphasis LUT or it is set to and directly applied to the adder, with use of only one emphasis LUT. On the other hand, the present invention can be realized through a minor modification of the hardware as shown in FIG. 7(b), because in this instance, the edge emphasis LUT and the edge attenuating LUT are constructed with a single LUT (FIG. 6(b)), and the data width of the data from the edge detector is adjusted and the necessary color signal "Hue" is added to the data.

Figure 8G:
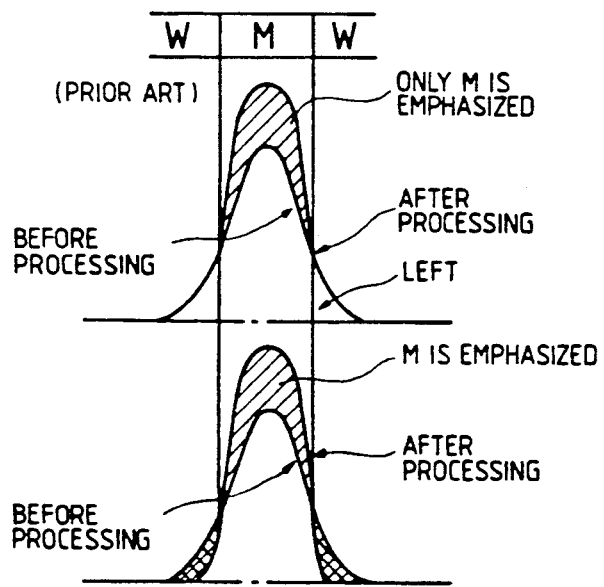

An edge emphasis based on the hue determination greatly improves the reproduction quality of the black character and color characters as well. Let us consider a case that a character of magenta M is inputted. In this case, as shown in FIG. 8(g), in an area where the color is determined to be M, the edge is emphasized, while in other areas, it is attenuated. As a result, the edge portions of gentle slope are removed. When compared with the conventional edge emphasis system, the portions W outside the portion M are determined to be the unnecessary colors, and removed. Accordingly, the reproduced character is sharp in shape As already stated, the beneficial effects comparable with this can be obtained for the remaining colors as hue detected, Y, M, C, K, B, G, R, and W.

(IV) SHARPNESS IMPROVEMENT

The sharpness of the image greatly affects the rise of a contour of an image, contrast of a thin or narrow area, contrast of a large area, or the reproduction quality of the black. The edge processing as mentioned above can remove the color impurity of a character in the edge portions, and can make the edge portions sharp. However, it cannot solve the problem of character widening or spread.

To solve this, in the present invention, a sharpness improving circuit is coupled with the edge processing circuit as mentioned above. With the additional use of this circuit, edge detection is made sharp in determining the hue. The character can be prevented from spreading or becoming wide, and the reproduction quality of thin characters can be improved.

FIG. 9 is a block diagram showing an arrangement of a first embodiment of a sharpness improving system for an image processor according to the present invention. FIGS. 10(a) and 10(b) show diagrams useful in explaining the sharpness improvement.

In FIG. 9, a selector 372 includes the UCR circuit as mentioned above, and executes the black generation and under color removal processings, and selects the developing color. A low-pass filter 373 is a smoothing filter for removing mesh dots and reproducing a smooth halftone image. A "r (gamma)" conversion circuit 374, an edge detect filter 375, and an LUT 376 make up a processor to detect edges and to generate an edge emphasis signal In the circuit arrangement as just mentioned, the added circuit is made up of a subtractor 377, multiplier 378, adder 379, comparator 380, and an AND gate 383, and functions as a correction circuit of the hue signal in connection with the non-linear filter processing circuit. The subtractor 377, which is connected between the input and output of the low-pass filter 373, calculates a difference between an original image signal and the output signal of the low-pass filter 373. The multiplier 378, which is connected to the output of the subtractor 377, multiplies that difference by "K", thereby to exercise a gain adjustment. The adder 379, which is connected between the output side of the subtractor 377 and the input side of the low-pass filter 373, adds together the output signal of the subtractor 377 and the original signal. The comparator 380 compares the output signal of the adder 379 with a threshold value "th" to binarize it. The AND gate 383 logically multiplies the binary signal output from the comparator 380 and the hue signal (necessary color signal) output from a hue discriminating circuit 382 to correct the hue signal.

Next, an overall operation of the circuit under discussion will be described. The subtractor 377 exercise the edge detection by calculating the difference between the output signal of the low-pass filter 373 and the original image signal. The combination of the low-pass filter 373 with an LP characteristic (FIG. 10(a)) and the subtractor 377 forms a high-pass filter having an HP characteristic. The edge detect signal outputted from the subtractor 377 is unsatisfactory in signal level. To amplify the weak signal, the multiplier 378 is used to multiply the edge detect signal by "k." That is, the gain adjustment is exercised by the multiplier. The output signal of the low-pass filter 373 are mixed by the mixer 381. In this way, a hue signal with sharp edges or the non-widened signal is generated. The edge addition control is possible by applying the table as mentioned above to the LUT 376 and selectively utilizing the necessary color area (emphasis LUT) and the unnecessary color area (attenuating LUT). The gain "k" is changed according to the colors Y, M, C, and K. FIGS. 11 and 12 are block diagrams showing arrangements of other embodiments of a sharpness improving system for an image processor according to the present invention.

In the sharpness improving circuit as mentioned above, the character widening problem can be effectively solved by merely inserting the simple circuit between the input and output sides of the low-pass filter 373. This sharpness improving circuit is not flexible in sharpness adjustment, however. Other embodiments according to the present invention, which are capable of adjusting the sharpness for each color, are shown in FIGS. 11 and 12.

The widening of the character depends largely on the MTF characteristic of the IIT and the developing characteristic of the IOT. In the IIT, the MTF characteristic of the IIT for the main scan direction is different from that for the vertical scan direction. The same is different for different colors, and is relatively good for green, but poor for blue and red. Therefore, the processing parameters must be changed or properly selected in connection with the different MTF characteristics. Otherwise, the character widening is different for the scan directions and colors. Also in the IOT, the developing characteristic changes depending on the scan directions, frequency, contrast, and the like. As a result, the character sharpness is not uniform among the reproduced color characters.

In the above-mentioned embodiment, the high-pass filter for edge detection is formed by combining the smoothing low-pass filter 373 and the subtractor 377. Therefore, the low-pass filter 373 must be considered in changing the characteristic of the high-pass filter. In other words, the low-pass filter uniquely determines the characteristic.

In the circuit arrangement of FIG. 12, individual high-pass filters 385 are connected to the output of the hue discriminating circuit 382. Those high-pass filters are properly selected for each original image signal. Provision of the high-pass filters 385 for hue detection allows a gain to be set freely for each color. By changing the parameters for each developing color, it is possible to reproduce sharp characters and lines well balanced among the colors Y, M, and C. As already described, the dull signal, by convention, is used for hue discrimination. On the other hand, in the present invention, the signal whose edges are sharp is input to the hue discriminating circuit 382, so that a hue signal free from the character widening can be obtained. This requires a large circuit arrangement. However, it allows the filter parameters to be changed or altered for each color. Accordingly, the edge emphasis and good color balance can be realized.

In the arrangement shown in FIG. 12, the subtractor 377, multiplier 378, and the subtractor 379 in the added circuit shown in FIG. 9 are replaced by a mixer 386 for mixing the respective colors and a high-pass filter 387. The mixer 386 calculates the following formula, for example, $A = k1Y + k2M + k3C$. The above calculation it produces an equivalent luminance signal to make an easy edge detection. This signal A is issued as an input signal to the high-pass filter 387. In this instance, the coefficients in the above formula are: $k1 = 0.11$, $k2 = 0.59$, and $k3 = 0.3$. The characteristic for each color can be adjusted by properly changing those individual coefficients. The coefficients and the DC components as well are set in the high-pass filter 387, and are selected for each developing color. Such an arrangement allows the coefficients of the mixer 386 and the coefficients of the high-pass filter 387 to be changed.

(V.) AREA DISCRIMINATION

(A) Different-Image Contained Image and Area Discrimination

According to the edge processing thus far described, in reproducing an original containing a binary image, such as characters and lines, and a halftone image, such as photographs and mesh-dot printing, the smooth halftone image is reproduced and the sharp binary image can be reproduced by properly selecting the parameters. With regards to the character image, the sharpness improvement removes the edges of black characters and impurity of small characters, and hence provides the reproduction of sharp characters.

For the halftone image to reproduce such smooth image and the character image whose edges are sharp, it is necessary to properly select the parameters. For this reason, parameters are selected by designating the halftone original or the character original, or the halftone area or the character area, and for the halftone/character image, the parameters are changed to different parameters. When the character image is reproduced using the parameters for the halftone, the edges and the small characters are dull or impure. When the halftone image is reproduced by using the parameters for the character, the edges in the halftone image are picked up and emphasized. The edges in the halftone image are extremely emphasized, and the reproduced image looks ragged. To cope with this, intermediate parameters which can weaken the edge emphasis and remove the dullness and impurity of characters, that is, are available for both the halftone and binary images, and are used in addition to the parameters for the halftone and those for the character.

The intermediate parameters can reproduce both the halftone image and the character image, but the quality of their reproduction is inferior to that when the halftone parameters and the character parameters are used. This leads to a conclusion that to obtain a satisfactory quality reproduction, the halftone area is discriminated from the character area, and the parameters must be selected according to the result of the discrimination.

The present invention discriminates the character area from the halftone area, selectively uses the character parameters or the halftone parameters according to the discrimination result, and improves the discrimination accuracy by using a simple circuit arrangement in which a large area discriminating circuit is merely coupled with the above-mentioned circuit. A specific arrangement implementing the above is shown in FIG. 13(a).

Figure 13A:
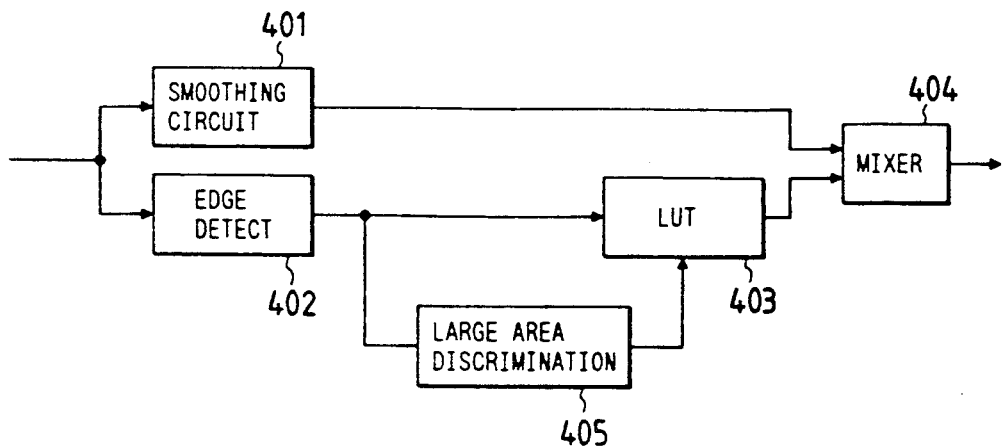

FIG. 13(a) shows a block diagram for explaining an embodiment of an area discriminating method for an image processing system according to the present invention.

In the area discriminating method for an image processing system according to the present invention, as shown in FIG. 13(a), a large area discriminating circuit 405 receives an edge signal from the non-linear edge detect filter 402, and discriminates the character area from the halftone area by using the received signal, and properly selects the parameters of the edge emphasis LUT 403 on the basis of the discrimination result. The discrimination processing by the circuit 405 determines an edge quantity for each color and discriminates between the character area and the halftone area for each block on the basis of the determination result.

Two block determinating methods are used, the method in which the block is fixed and the other in which the block is variable. With the use of two steps of processing, a mistaken determination can be corrected in that the character region may be locally recognized as the character region and vice versa. In this point, the area discrimination accuracy is improved.

Figure 13B:
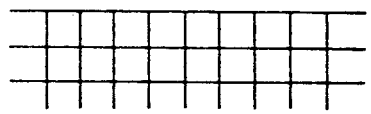
Figure 13C:
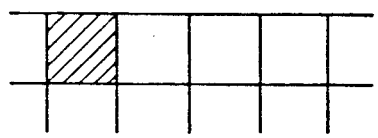

The large area processing circuit 364 obtains the feature parameter of each pixel for each block consisting of m×n picture elements, as shown in FIG. 13(b). The representative values of them are used as a train of block data as shown in FIG. 13(c). The representative value of the block data train is used for area discrimination. A colligation of those blocks is likewise used for area discrimination.

A specific arrangement of the large area discriminating circuit will be described with reference to FIGS. 14(a) through 14(c).

B) Fixed Block Discrimination Method

FIGS. 14(a) through 14(c) show a block diagram of a large area discriminating circuit based on the fixed block discrimination method. In the fixed block discrimination method, to discriminate between the character area and the halftone area, a block of a fixed size is set up, and a representative value is obtained. A typical representative value Ab is an average value of picture elements of m x n, and is $$Ab = e(i)/A.$$

This value cannot provide a large difference of the values between the character area and the halftone area. This makes it difficult to discriminate the character area and the halftone area. Accordingly, a poor-discrimination accuracy is obtained. To avoid this, noticing the fact that in most of the character area, the background density is low, an average value Ab' in the area A' except those is used as the representative value, which is given by $$Ab' = e(i)/A'.$$

Figure 13D:
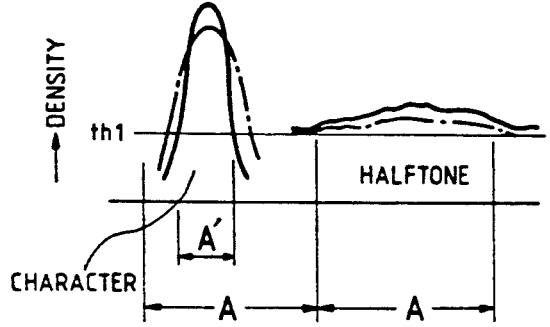
Figure 13E:
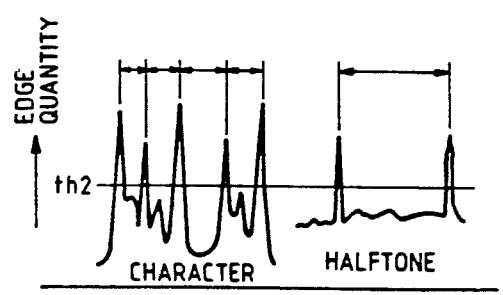

Specifically, if an average value is uniformly calculated for fixed ranges A shown in FIG. 13(d), the average values Ab in the character area and the halftone area are substantially equal. Those areas are indistinguishable one from the other. Since in the character area, the background is thin, a threshold value th1 is used as shown in FIG. 13(d). In an area A' where the optical density is above the threshold value th1, the sum total e(i) of the edge quantities is averaged. Then, the character area exhibits a high value to make a distinction between the character area and the halftone area.

In the circuit shown in FIG. 14(a), FIFOs 411 and 412 store 8-bit data in which 4 high order bits are assigned to density data and 4 low order bits, to edge data. Latch circuit (DF: D-type flip-flop) groups 413 and 414 store the 8-bit data output from the FIFOs 411 and 412 for every picture element. The FIFOs 411 and 412, the latch circuit groups 413 and 414, and a selector 415 cooperate to pick up picture elements in a block of m×n size. A timing controller 416 generates read/write timings of the whole from a clock signal, and controls the timings of holding, select, arithmetic operation of data, and the like in the respective circuits. A comparator 417 receives the density data of the 4 high order bits of the 8-bit data of the picture element as selected by the selector 415. A counter 418 counts the number of the picture elements of the density data exceeding the threshold value th1. An adder 419 receives the edge data corresponding to the 4 low order bits of the picture element as selected by the selector 415, and adds the edge quantities to obtain the total sum of the edge quantities. A divider 420 divides the total sum e(i) by a value A' outputted from the counter 408 to obtain an average value Ab'. When a preset number of picture elements (m×n) are arithmetically operated, the timing controller 416 applies a latch pulse to a latch circuit 421. Upon receipt of the latch pulse, the latch circuit 421 latches the average value Ab' as calculated by the divider 420. A comparator 422 compares the average value Ab' with the threshold value th2, and determines that block to be in the character area or the halftone area on the comparison result, and transfers the determination result to the FIFO 423.

The operation of the circuit of FIG. 14(a) will be described in connection with FIGS. 13(b) to 13(d). The counter 418 counts the number of picture elements having density data exceeding the threshold value th1 within a block shown in FIG. 13(b) (the area A' shown in FIG. 13(d). The adder 419 calculates the total sum e(i) of the edge quantities within the range A'. The comparator 422 determines whether the average value Ab' of those total sums is in the character area or the halftone area, and transfers the determined value to the FIFO 423 for each block shown in FIG. 13(c).

An arrangement shown in FIG. 14(b) calculates a ratio of the number of picture elements having edge quantity exceeding a threshold value th2 and the number of picture elements having an optical density exceeding the threshold value th1, and determines whether the image area is the character area or the half tone area on the basis of the calculated ratio. Comparators 431 and 433, and counters 432 and 434 make the comparisons of the edge quantity and the optical density with the threshold values, and count the number of picture elements. A divider 435 calculates a ratio of the number of picture elements having edge quantity exceeding a threshold value th2 and the number of picture elements having an optical density exceeding the threshold value th1. A latch 436 latches the ratio calculated by the divider 435. A comparator 437 compares the ratio latched in the latch circuit 436 with a threshold value th3, to determine whether the image area is the character area or the halftone area. When it is the character area, the number of picture elements whose edge quantity is larger than the threshold value th2, increases with respect to the number of picture elements having optical density exceeding the threshold value th1. Accordingly, in such a case, the comparator determines that the area is the character area.

An arrangement shown in FIG. 14(c) binarizes an optical density of each picture element within a block at the threshold value th1, and determines the image area to be the halftone area when the picture elements within the block are "1"s or "0"s. The comparator 441 binarizes an optical density of each picture element at the threshold value th1. A counter 442 counts the picture elements whose optical density exceeds the threshold value th1. A LUT 443 generates a signal indicative of "1"s or "0"s of the all of the picture elements within the block. When the number of picture elements within the block is 8×2, the LUT 443 produces a "0" signal representative of the halftone area when the count of the counter 442 is "0" or "16". It produces a "1" signal when the counter produces other values. An AND circuit 448 logically sums the output data the LUT 443 with the output data of the comparator 447. The comparator 447 has the same function as that of the comparator 422 shown in FIG. 14(a). Accordingly, even in the case that the circuit of FIG. 14(a) determines the image area is a character area, the instant circuit determines it to be a half tone area if the output data of the LUT 443 is "0."

Alternatively, the number of picture elements each having the edge quantity larger than the threshold value th2, may be counted. In this case, the count is large in character area and its interval is short. By these features, a distinction between the character area and the halftone area can be made.

(C) Variable Block Discrimination Method

A variable block discrimination method makes a distinction between the character area and the halftone area on the basis of a distance between the edges. FIGS. 15(a) and 15(b) show an explanatory diagram for explaining the variable block discrimination method for making a distinction between the different image areas on the basis of the edge interval. FIG. 16 is a block diagram showing an arrangement of a large area discrimination circuit using the variable block discrimination method.

In FIG. 15(a), an edge quantity distribution is indicated by a solid line, and an optical density distribution, by a one-dot chain line. In this discrimination method, distances L0, L1, L2, ... between the adjacent edges are measured. When the edge interval is shorter than a threshold value $th_1$, the image a is determined to be a character area. If greater, it determined to be a halftone area. The accuracy of the determination can be improved in a manner that if the edge interval L is shorter than the threshold value th1 and an average density between the edges is low, the area is determined to be a character area. Alternatively, if the interval L is shorter than the threshold value th, and the minimum optical density between the edges is lower than a preset threshold value, the image area is determined to be the character area. A specific circuit arrangement for the above method is as shown in FIG. 16.

In FIG. 16, a counter 454 counts a clock signal to measure the edge interval L. A comparator 453 detects edge data in excess of a threshold value "th." Latch circuits 455 and 456 latch the count of the counter 454 when the comparator 453 detects an edge. When an edge is detected by the comparator 453, the count of the counter 454 at that time is latched by the latch circuit 455. A value latched in the latch circuit 455 is then latched by the latch circuit 456. Accordingly, the difference between the values in the latch circuits 455 and 456 represents the edge distance L. A subtractor 457 calculates that difference. An address controller 459 generates a write address of an SRAM 460 between the value in the latch circuit 455 and the value in the latch circuit 456. A comparator 458 determines whether or not the distance L between the edges as calculated by the subtractor 457 is shorter than the threshold value thL. When the distance L is shorter than the threshold value thL, the comparator produces a signal with a value of "1." In the reverse case, it produces a signal with a value of "0." The output value of the comparator 458 is written into a memory location in the SRAM 460 as specified with an address generated by the address controller 459.

An operation of the instant arrangement will be described in brief. Edge data in excess of the threshold value "th" at the intervals of the distance L is input to the arrangement. In response to first edge data above the threshold value "th," the comparator 453 produces an edge detect signal. A value Xi-1 in the counter 454 at that time is latched in the latch circuit 455. Succeedingly, the comparator 453 receives the next (second) edge data above the threshold value "th," and produces an edge detect signal. A value Xi in the counter 454 at that time is latched in the latch circuit 455, while the count value Xi-1 stored in the latch circuit 455 is stored into the latch circuit. In turn, the subtractor 457 calculates the distance L between the edges as follows:

$$L = (x_i - X_{i-1}).$$

The comparator 458 checks if the distance L is shorter than the threshold value thL. If the comparator 458 produces an output signal of logic "1," the data signal "1" is written into the SRAM 460 during the interval between the first and second edge data exceeding the threshold value "th." In other words, this interval is determined to be the character area. In contrast, if the comparator 458 produces a signal of logic "0," the data signal "0" is written into the SRAM 460 during that interval. That is, the interval is determined to be the halftone area.

As seen from the foregoing description, an area discrimination system according to the present invention evaluates the edge quantity and the optical density, and synthetically discriminates between the character area and the halftone area for each block on the basis of the evaluations. Accordingly, erroneous determinations that may occur locally can be corrected, so that the image area can be recognized with high accuracy. In reproducing an original containing both character and halftone images, the parameters best fit to the respective image can be selectively used. Accordingly, the reproduced halftone image look smooth, and the reproduced character images are clear with the edges being emphasized.

What is claimed is:

1. An area discriminating system for use in an image processing system capable of processing an image signal including character images signals and halftone images signals comprising:

hue determining means for determining the hues of the images represented by the image signal and for producing hue present signals for each color of a selected number of colors which is a component of said hues of the images and hue absent signals for each color of said selected number of colors which is not a component of said hues of the images;

edge detecting means for detecting edge portions of images represented by the image signal and for producing edge signals having values representing said edge portions; and edge emphasis means for receiving said hue present signals, said hue absent signals, and said edge signals and for producing edge emphasized signals for each hue included in the portion of the image represented by said edge signals, wherein said edge emphasis means produces said edge emphasized signals to have a larger signal value than corresponding edge signals.

2. An area discriminating system according to claim 1, wherein said edge emphasis means produces edge attenuated signals for each hue present in the portion of the image represented by said edge signals which does not have a hue present signal exceeding a threshold value.

3. An area discriminating system according to claim 1 further including hue correcting means comprising:

means for processing each of said hue present signals to produce corresponding enhanced hue present signals;

means for comparing each of said enhanced hue present signals to a hue threshold value; and means for changing a hue present signal to a hue absent signal if said enhanced hue present signal corresponding to said changed hue present signal does not exceed said hue threshold signal.

4. An area discriminating system according to claim 3, wherein said processing means comprises:

a first low pass filter for filtering said hue present signals to produce corresponding filtered hue present signals; and a first subtractor for subtracting said filtered hue present signals from said hue present signals to produce corresponding hue base signals;

a first multiplier for multiplying said hue base signals by a selected value to produce said enhanced hue present signals.

5. An area discriminating system according to claim 1, further including image determining means for determining whether the image represented by the image signal is a halftone image or a character image and wherein said edge emphasis means produces said edge emphasized signals further in accordance with said image determination.

6. An area discriminating system according to claim 5, wherein said image determining means comprises a block area discriminating means for calculating for a block area of the image an average value of said edge signals in the block having values exceeding a threshold edge value and for determining that the block area represents a character area if said average value exceeds a predetermined average threshold edge value and a halftone area if said average value is less than a predetermined average threshold edge value.

7. An area discriminating system according to claim 5, wherein said image determining means determines that a block area of the image comprises a halftone area if the optical density of the image signals representing said block area has a predetermined relationship to a selected optical density threshold value.

8. An area discriminating system according to claim 5, wherein said image determining means comprises a block area discriminating means for calculating for a block area of the image the ratio of the number of picture signals having a value exceeding a present density threshold value and the number of picture signals having edge signals exceeding a preset edge threshold value and for discriminating the block area to be a character image or a halftone image based on said calculated ratio.

9. An area discriminating system according to claim 5, wherein said image determining means comprises a block area discriminating means for calculating for a block area of the image the distances between consecutive edge signals having corresponding values exceeding a preset edge threshold value and for determining if said block area contains a character image or a halftone image based on said calculated distance.

10. An area discriminating system according to claim 9, wherein said image determining means further determines if said block area contains a character image or a halftone image based upon the value of said edge signals with respect to a predetermined average density value.

11. An area discriminating system for use in an image processing system capable of processing an image signal including character images signals and halftone images signals comprising:
   an edge detecting filter including a high pass filter for detecting an edge quantity of a high frequency component of the image signal and for generating an edge signal;
   hue detecting mans for detecting the hues of images represented by the image signal and for generating a hue signal;
   emphasis signal generating means for generating an emphasis signal for edge portions on the basis of the edge signal and the hue signal; and
   large area discriminating means for determining the characteristics of each of a plurality of image area blocks based on the edge signal of each picture element,
   wherein the image processing system controls the reproduction of an image according to the characteristics of the image area blocks by selecting parameters of said emphasis signal generating means for each image area block.

12. An area discriminating system according to claim 11, wherein said emphasis signal generating means generates said emphasis signals to have a larger signal value than corresponding edge signals.

13. An area discriminating system according to claim 11, wherein said emphasis signal generating means produces edge attenuated signals for each hue present in the portion of the image represented by said edge signals which does not have a hue signal exceeding a threshold value.

14. An area discriminating system according to claim 11, further including hue correcting means comprising:
   means for processing each of said hue signals to produce corresponding enhanced hue signals;
   means for comparing each of said enhanced hue signals to a hue threshold value; and
   means for changing a hue signal to a hue absent signal if said enhanced hue signal corresponding to said changed hue signal does not exceed said hue threshold signal.

15. An area distributing system according to claim 14, wherein said processing means comprises:
   a first low pass filter for filtering said hue signals to produce corresponding filtered hue present signals; and
   a first subtractor for subtracting said filtered hue signals from said hue signals to produce corresponding hue base signals;
   a first multiplier for multiplying said hue base signals by a selected value to produce said enhanced hue present signals.

* * * * *

UNITED STATES PATENT AND TRADEMARK OFFICE
CERTIFICATE OF CORRECTION

PATENT NO. : 5,134,667
DATED : July 28, 1992
INVENTOR(S) : Yuzuru Suzuki

It is certified that error appears in the above-identified patent and that said Letters Patent is hereby corrected as shown below:

Claim 11, column 27, line 17, change "mans" to --means--.

Claim 15, column 28, line 21, change "distributing" to --discriminating--.

Claim 15, column 28, line 24, Delete "present".

Claim 15, column 28, line 31, Delete "present".

Signed and Sealed this

Twelfth Day of October, 1993

Attest:

BRUCE LEHMAN

Attesting Officer          Commissioner of Patents and Trademarks